United States Patent
Boundy et al.

(10) Patent No.: US 11,841,065 B2
(45) Date of Patent: Dec. 12, 2023

(54) SYSTEMS AND DEVICES FOR MOTION CONTROL

(71) Applicant: Moshun, LLC, Oak Brook, IL (US)

(72) Inventors: Timothy John Boundy, Deer Park, IL (US); Richard Michael Lang, Howey In The Hills, FL (US)

(73) Assignee: MOSHUN, LLC, Oak Brook, IL (US)

( * ) Notice: Subject to any disclaimer, the term of this patent is extended or adjusted under 35 U.S.C. 154(b) by 0 days.

(21) Appl. No.: 17/570,504

(22) Filed: Jan. 7, 2022

(65) Prior Publication Data

US 2022/0221019 A1    Jul. 14, 2022

Related U.S. Application Data

(60) Provisional application No. 63/135,244, filed on Jan. 8, 2021.

(51) Int. Cl.
| | |
|---|---|
| *F16F 9/19* | (2006.01) |
| *F16F 9/30* | (2006.01) |
| *F16F 9/53* | (2006.01) |
| *E05D 3/02* | (2006.01) |
| *E05F 5/02* | (2006.01) |

(52) U.S. Cl.
CPC .................. *F16F 9/19* (2013.01); *E05D 3/02* (2013.01); *E05F 5/02* (2013.01); *F16F 9/30* (2013.01); *F16F 9/53* (2013.01); *F16F 2224/041* (2013.01)

(58) Field of Classification Search
CPC ........ F16F 9/19; F16F 9/30; F16F 9/53; F16F 2224/041
See application file for complete search history.

(56) References Cited

U.S. PATENT DOCUMENTS

| 1,504,518 | A | * | 8/1924 | Schnitzler | ................. | E05F 3/08 |
| | | | | | | 16/70 |
| 1,704,217 | A | | 3/1929 | Rosenthal | | |
| 1,736,175 | A | | 11/1929 | Rosenthal et al. | | |
| 1,965,806 | A | * | 7/1934 | Riggins | ................... | E05F 3/108 |
| | | | | | | 16/80 |
| 2,015,989 | A | | 10/1935 | Bommer | | |

(Continued)

FOREIGN PATENT DOCUMENTS

| CN | 210087086 U | 2/2020 |
| DE | 202006006422 | 8/2006 |

(Continued)

OTHER PUBLICATIONS

Int'l Search Report and Written Opinion Appln No. PCT/US2022/011661 dated Jul. 4, 2022.

(Continued)

*Primary Examiner* — Vishal R Sahni
(74) *Attorney, Agent, or Firm* — McAndrews, Held & Malloy, Ltd.

(57) ABSTRACT

Systems and devices to control linear, rotational, and/or arcuate motion are provided herein. In some examples, a pin system is configured for insertion in a door and/or door jamb, and to control motion of the door, such as a speed with which the door closes. In some examples, a hinge pin is configured to replace a conventional hinge pin and to control motion of the door. In some examples, a hinge system is configured to replace a conventional door hinge and to control motion of the door.

21 Claims, 48 Drawing Sheets

(56) References Cited

U.S. PATENT DOCUMENTS

| | | | |
|---|---|---|---|
| 2,740,308 A | 4/1956 | Blanchard | |
| 3,284,841 A | 11/1966 | Patriquin | |
| 3,400,796 A | 9/1968 | Savins | |
| 3,487,494 A | 1/1970 | De Baan et al. | |
| 3,489,087 A | 1/1970 | Soderberg | |
| 3,548,977 A * | 12/1970 | Morgan | F16F 9/467 188/282.5 |
| 3,979,790 A | 9/1976 | Chiarappa | |
| 4,452,437 A | 6/1984 | Lochner | |
| 4,590,639 A | 5/1986 | Fritsche et al. | |
| 4,658,468 A | 4/1987 | Tillmann | |
| 5,078,552 A | 1/1992 | Albel | |
| 5,172,929 A | 12/1992 | Butsuen | |
| 5,924,714 A | 7/1999 | Farris | |
| 7,628,257 B1 | 12/2009 | Lu | |
| 7,825,045 B1 * | 11/2010 | Wagner | D02G 3/40 2/2.5 |
| 7,918,167 B2 | 4/2011 | Tanielian | |
| 8,276,497 B2 | 10/2012 | Hunn | |
| 8,499,908 B2 | 8/2013 | Barker | |
| 8,943,652 B2 | 2/2015 | Bacchetti | |
| 9,303,709 B2 | 4/2016 | Manes | |
| 9,453,550 B2 | 9/2016 | Smith | |
| 9,498,690 B2 | 11/2016 | Carlson | |
| 9,970,831 B2 | 5/2018 | Shih | |
| 10,017,082 B2 | 7/2018 | Zwaan | |
| 10,161,173 B2 | 12/2018 | Kruedener | |
| 10,371,097 B2 | 8/2019 | Sellinger | |
| 10,443,678 B2 | 10/2019 | Galindo Rosales | |
| 10,462,578 B2 | 10/2019 | Hoskins | |
| 10,480,281 B2 | 11/2019 | Al-Oayan | |
| 10,580,231 B2 | 3/2020 | Lin | |
| 10,633,905 B2 | 4/2020 | Feng | |
| 10,920,474 B2 | 2/2021 | Shinmura | |
| 2002/0010977 A1 | 1/2002 | Salice | |
| 2003/0155196 A1 | 8/2003 | Nishiyama | |
| 2003/0213663 A1 | 11/2003 | Alice | |
| 2004/0068833 A1 | 4/2004 | Sawa | |
| 2005/0034269 A1 | 2/2005 | Jinbo | |
| 2006/0278483 A1 | 12/2006 | Jiang | |
| 2009/0119873 A1 * | 5/2009 | Bassi | E05F 5/08 16/84 |
| 2009/0241287 A1 | 10/2009 | Reid et al. | |
| 2010/0162521 A1 | 7/2010 | Pyo | |
| 2010/0170062 A1 | 7/2010 | Kim | |
| 2010/0287729 A1 | 11/2010 | Jin et al. | |
| 2010/0319260 A1 | 12/2010 | Sawa | |
| 2011/0127706 A1 * | 6/2011 | Sims | B62K 25/04 267/221 |
| 2012/0233810 A1 | 9/2012 | Salutzki | |
| 2013/0097805 A1 | 4/2013 | Bland | |
| 2014/0033476 A1 | 2/2014 | Bacchetti | |
| 2014/0352111 A1 | 12/2014 | Ng | |
| 2015/0040998 A1 | 2/2015 | Gilstad et al. | |
| 2016/0215552 A1 | 7/2016 | Öhken et al. | |
| 2016/0238100 A1 | 8/2016 | Smith | |
| 2017/0096850 A1 | 4/2017 | Hopkins | |
| 2017/0210458 A1 | 7/2017 | Tothill | |
| 2017/0226682 A1 | 8/2017 | Duckworth | |
| 2017/0304057 A1 | 10/2017 | Bichler | |
| 2018/0010614 A1 | 1/2018 | Sellinger | |
| 2018/0266512 A1 | 9/2018 | Zimmer | |
| 2018/0328445 A1 * | 11/2018 | Gilbert | B60G 17/016 |
| 2019/0040667 A1 * | 2/2019 | Feng | E05F 3/20 |
| 2019/0128362 A1 | 5/2019 | Naserimojarad et al. | |
| 2019/0371090 A1 | 12/2019 | Lin | |
| 2020/0011110 A1 * | 1/2020 | Boundy | B23B 49/02 |
| 2020/0238780 A1 | 7/2020 | Dhaens | |
| 2020/0240190 A1 * | 7/2020 | Held | E05F 5/10 |
| 2020/0408019 A1 | 12/2020 | Vos | |
| 2022/0220788 A1 | 7/2022 | Boundy | |
| 2022/0221019 A1 * | 7/2022 | Boundy | F16F 9/3405 |
| 2022/0221020 A1 | 7/2022 | Boundy | |

FOREIGN PATENT DOCUMENTS

| | | | |
|---|---|---|---|
| DE | 202006011846 | | 12/2007 |
| DE | 102008014329 A1 | | 9/2009 |
| EP | 0063635 A1 | | 11/1982 |
| GB | 2589152 A | | 5/2021 |
| JP | 2003-266222 | | 9/2003 |
| JP | 2004-353712 | | 12/2004 |
| JP | 2009-531631 | | 9/2009 |
| JP | 2014-118303 | | 6/2014 |
| KP | 20-2004-00 1860 | | 6/2004 |
| KR | 200165472 Y1 | | 2/2000 |
| KR | 10-0337469 B1 | | 5/2002 |
| KR | 20070014713 A | | 2/2007 |
| KR | 102117780 B1 | | 6/2020 |
| WO | 2007/116273 | | 10/2007 |
| WO | 2015/132254 A1 | | 9/2015 |
| WO | 2020103458 A1 | | 5/2020 |
| WO | WO-2020103458 A1 * | 5/2020 | E04H 9/0237 |

OTHER PUBLICATIONS

Int'l Search Report and Written Opinion Appln No. PCT/US2019/040533 dated Oct. 1, 2019.
Non-Final Office Action U.S. Appl. No. 16/502,470 dated Jun. 30, 2021.
Final Office Action U.S. Appl. No. 16/502,470 dated Nov. 15, 2021.
Non-Final Office Action U.S. Appl. No. 16/502,470 dated Mar. 4, 2022.
Final-Office Action, U.S. Appl. No. 16/502,470, dated Sep. 20, 2022 (16 pages).
Advisory Action, U.S. Appl. No. 16/502,470, dated Jan. 5, 2023 (7 pages).
Non-Final Office Action, U.S. Appl. No. 16/502,470, dated Jan. 31, 2023 (17 pages).
Non-Final Office Action, U.S. Appl. No. 17/570,509, dated Jan. 5, 2023 (7 pages).
Final Office Action, U.S. Appl. No. 17/570,509, dated Apr. 6, 2023 (11 pages).
Non-Final Office Action, U.S. Appl. No. 17/570,509 dated Jul. 18, 2023 (9 pages).
Non-Final Office Action, U.S. Appl. No. 16/502,470, dated Aug. 23, 2023 (22 pages).
Notification of Transmittal of the International Search Report and the Written Opinion of the International Searching Authority, or the Declaration, PCT/US23/16082; dated Aug. 24, 2023 (20 pagers).

* cited by examiner

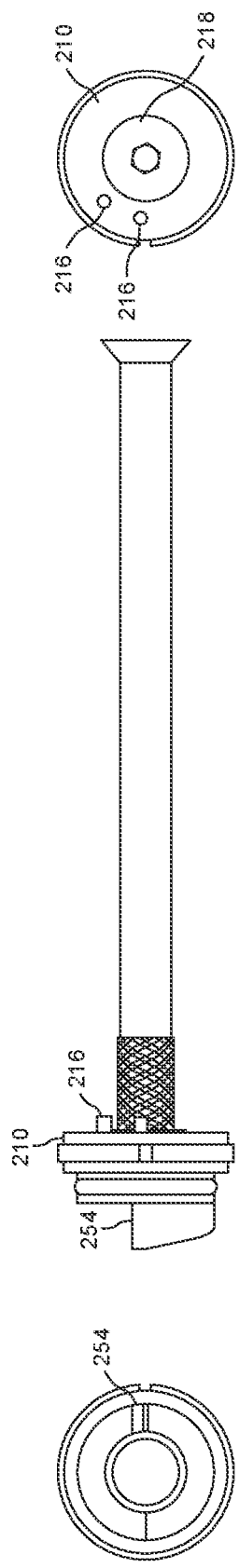

Section C-C

Section B-B

Section E-E

SYSTEMS AND DEVICES FOR MOTION CONTROL

RELATED APPLICATIONS

The present application claims the benefit of, and priority to, U.S. Provisional Application No. 63/135,244, filed Jan. 8, 2021, titled "Systems and Devices for Motion Control." The complete subject matter and contents of App. Ser. No. 63/135,244 are incorporated herein by reference in their entireties.

BACKGROUND

The slamming of a door can cause many problems. For instance, there is the risk that the door could be slammed on a person's fingers—often the fingers of a child. Additionally, slamming a door may result in a person or a pet being locked in a room. Moreover, nobody enjoys the loud sound of a slammed door. Besides the slamming of a door, there are numerous other situations, especially in industrial settings, where, if motion of an object is not adequately dampened or controlled, the motion can cause damage to equipment, harm to a person, and/or unpleasant noises.

SUMMARY

The systems and devices described herein utilize a Shear Thickening Fluid (STF) to allow a door to close normally when lighter pressure is applied during closure and to dampen, slow, and/or stop a door from slamming when greater pressure or speed is applied. STF is relaxed at rest and behaves nearly like most viscous liquids under minimal shear or pressure (e.g., flowable, pourable, etc.). Under normal closing conditions, the fluid remains relaxed and the door closes easily. When pressure or shear forces are applied, the fluid stiffens instantaneously, providing the functionality needed to work with devices described herein, which act to control the speed of a door or other devices. Adjustability of the amount of resistance has been designed into the devices as well.

BRIEF DESCRIPTION OF THE DRAWINGS

FIGS. 25-31 illustrate an example cam secured to a pin according to an embodiment of the present technology.

Figure 1:
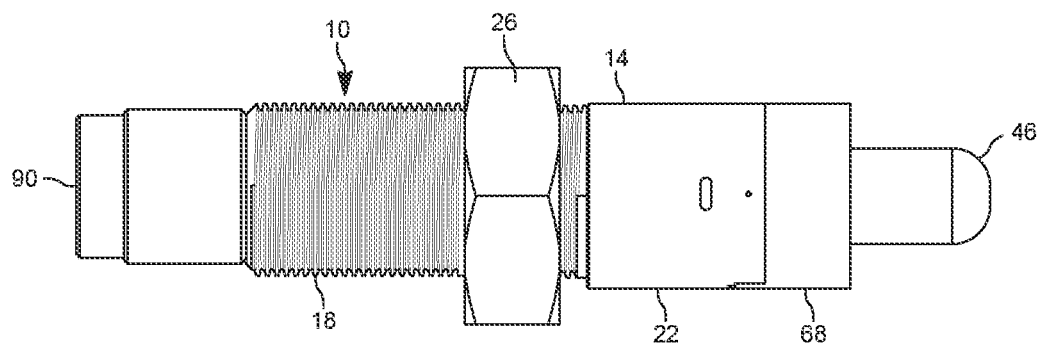
FIG. 1 is a side view of an example linear motion control system according to an embodiment of the present technology.

The foregoing summary, as well as the following detailed description of certain embodiments of the present technology(s), will be better understood when read in conjunction with the appended drawings.

DETAILED DESCRIPTION

Systems and devices to control linear, rotational, and/or arcuate motion are disclosed herein. In disclosed examples, a pin system is configured for insertion in a door and/or door jamb, and to control motion of the door, such as a speed with which the door closes. In some disclosed examples, a hinge pin is configured to replace a conventional hinge pin and to control motion of the door. In some disclosed examples, a hinge system is configured to replace a conventional door hinge and to control motion of the door. For the purpose of illustrating the technology, there are shown in the attached drawings, certain embodiments of the systems. It should be understood, however, that the technology is not limited to the arrangements and instrumentalities shown in the drawings or to the descriptions of the embodiments herein.

In disclosed examples, a device for controlling the motion of an object, including a body that includes a chamber filled at least in part with a shear thickening fluid, a piston that is positioned in the body and that is connected to a cap, the piston configured to exert pressure against the shear thickening fluid in response to a force applied to the cap by an object, and a rod connected to the piston, the rod configured to adjust an amount of pressure exerted against the shear thickening fluid.

In some examples, the piston includes a plunger that is connected to a piston head.

In examples, a bushing to guide the cap and plunger into the chamber in response to the force applied to the cap. In examples, a spring that is configured to provide mechanical resistance between the cap and the bushing in response to the force applied to the cap.

In some examples, the shear thickening fluid comprises a plurality of nanoparticles. In examples, the plurality of nanoparticles comprises one or more of an oxide, calcium carbonate, synthetically occurring minerals, naturally occurring minerals, polymers, $SiO_2$, polystyrene, polymethylmethacrylate, or a mixture thereof.

In some examples, the shear thickening fluid comprises a polymeric material. In some examples, the shear thickening fluid comprises one or more of ethylene glycol, polyethylene glycol, ethanol, silicon oils, phenyltrimethicone, or a mixture thereof.

In some examples, including a shim, wherein both the shim and the piston head include one or more slots. In examples, the one or more slots of the shim have a shape and size approximately equal to the one or more slots of the of the piston head. In examples, the shim is configured to rotate with respect to the piston head thereby adjusting the amount of resistance experienced by the piston. In examples, rotation of the shim to a first position substantially aligns the one or more slots of the shim with the one or more slots of the of the piston head, and rotation of the rebound shim to a second position substantially misaligns the one or more slots of the shim with the one or more slots of the of the piston head.

In some examples, the rod is connected to the shim and when the rod is rotated, the shim is rotated with respect to the piston head. In some examples, a knob that is located opposite the cap and that is connected to the rod, wherein the knob can be rotated to rotate the rod. In examples, the rod includes a generally D-shaped lip and the slot shim includes a generally D-shaped hole that receives the lip of the rod. In examples, the piston includes a plug that is received in the lip of the rod.

In disclosed examples, a device for controlling the motion of an object, includes a body that includes a chamber filled at least in part with a shear thickening fluid, a piston that is positioned in the body and that is connected to a cap, the piston configured to exert pressure against the shear thickening fluid in response to a force applied to the cap by an object, and a rod that includes a first portion and a second portion, wherein the first portion is connected to the piston and configured to adjust an amount of pressure exerted against the shear thickening fluid.

In some examples, the first portion is configured to slide with respect to the second portion with movement of the piston in response to the force applied to the cap. In some examples, the piston includes a shim including one or more slots, and a piston head including one or more slots, wherein the shim is configured to rotate with respect to the piston head to adjust alignment between the one or more slots of the shim and the one or more slots of the piston head.

In examples, the second portion is connected to a knob that is located opposite the cap, wherein the knob can be rotated to rotate the second portion connected to the first portion thereby rotating the shim relative to the piston head.

In disclosed examples, a device for controlling the motion of a door, includes a body that includes a chamber filled at least in part with a shear thickening fluid, the body being configured to be connected to a first hinge leaf of a door hinge, wherein the body includes a piston and a cam in the chamber, and a pin that is connected to a second hinge leaf of the door hinge and that is connected to the cam, and wherein when the second hinge leaf is rotated, the pin rotates, which causes the cam to rotate and push the piston to exert pressure against the shear thickening fluid.

In some examples, the piston includes a piston head. In examples, a shim, wherein both the shim and the piston head include one or more slots. In examples, the one or more slots of the shim have a shape and size approximately equal to the one or more slots of the of the piston head. In examples, the shim is configured to rotate with respect to the piston head thereby adjusting the amount of resistance experienced by the piston. In some examples, rotation of the shim to a first position substantially aligns the one or more slots of the shim with the one or more slots of the of the piston head, and rotation of the rebound shim to a second position substantially misaligns the one or more slots of the shim with the one or more slots of the of the piston head.

In some examples, a cam follower arranged in the chamber and connected to the cam on a first end and connected to the piston on a second end, wherein the cam includes a raised portion to move the cam follower axially as the cam rotates. In examples, rotating the first hinge leaf away from the second hinge leaf rotates the cam in a first direction causing the cam follower to push the piston away from the cam.

In some examples, rotating the first hinge leaf toward the second hinge leaf rotates the cam in a second direction allowing the cam follower to move the piston toward the cam. In examples, a spring to bias the cam follower toward the cam, thereby forcing the cam follower toward the cam as the first hinge leaf rotates toward the second hinge leaf.

In disclosed examples, a device for controlling the motion of a door, includes a body that includes a first chamber filled at least in part with a shear thickening fluid, and a second chamber fluidly isolated from the first chamber, the body being configured to be connected to a first hinge leaf of a door hinge, wherein the body includes a piston and a cam in the chamber, a cam arranged in the second chamber and connected to a second hinge leaf of the door hinge, a cam follower arranged in the second chamber and connected to the cam on a first end and connected to a piston on a second end, wherein the piston is arranged in the first chamber, and wherein, when the second hinge leaf is rotated, the cam rotates, which causes the cam follower to push the piston to exert pressure against the shear thickening fluid.

In some examples, the piston includes a shim including one or more slots, and a piston head including one or more slots, wherein the shim is configured to rotate with respect to the piston head to adjust alignment between the one or more slots of the shim and the one or more slots of the piston head.

In examples, a cap adjuster that includes a rod extending into the chamber, wherein the piston includes a plug having a slot that is configured to receive the rod. In examples, the plug is configured to secure the shim relative to the piston head. In examples, the rod is configured to mate with the slot of the plug such that rotation of the cap adjuster causes rotation of the plug and the shim, thereby adjusting the amount of alignment between the shim and the piston head.

In some examples, the one or more slots of the shim have a shape and size approximately equal to the one or more slots of the of the piston head.

In some examples, the cam includes a raised portion to move the cam follower axially as the cam rotates. In examples, rotating the first hinge leaf away from the second hinge leaf rotates the cam in a first direction causing the cam follower to push the piston away from the cam.

In some examples, rotating the first hinge leaf toward the second hinge leaf rotates the cam in a second direction causing the cam follower to move the piston toward the cam. In examples, a spring to bias the cam follower toward the cam, thereby forcing the cam follower toward the cam as the first hinge leaf rotates toward the second hinge leaf.

In disclosed examples, a device for controlling the motion of a door, including a first hinge leaf that includes a chamber filled at least in part with a shear thickening fluid, the chamber further retaining a bushing and a plunger, wherein the bushing and plunger are connected to a screw, and a second hinge leaf that includes a nut and a portion of the screw, and wherein when the first hinge leaf is rotated, the screw rotates such that the bushing and plunger move vertically such that a piston connected to the plunger exerts pressure against the shear thickening fluid.

In some examples, the piston includes a piston head. In examples, a shim, wherein both the shim and the piston head include one or more slots. In examples, the one or more slots of the shim have a shape and size approximately equal to the one or more slots of the of the piston head.

In some examples, the shim is configured to rotate with respect to the piston head thereby adjusting the amount of resistance experienced by the piston. In examples, rotation of the shim to a first position substantially aligns the one or more slots of the shim with the one or more slots of the of the piston head, and rotation of the rebound shim to a second position substantially misaligns the one or more slots of the shim with the one or more slots of the of the piston head.

In some examples, an extension connected to the shim and when the extension is rotated, the shim is rotated with respect to the piston head. In examples, a knob that is connected to the extension, wherein the knob can be rotated to rotate the extension.

In some examples, a dowel pin to extend through the screw, the bushing and the plunger. In examples, the bushing includes a slot oriented with vertical movement of the lead screw, the dowel pin partially extending into the slot. In examples, the slot limits the vertical movement of the dowel pin, the screw, the bushing and the plunger during rotation of the screw.

In some examples, the screw, the bushing and the plunger are held in the same rotational position relative to each other during rotation of the screw.

In some examples, a cap connected to the nut, the cap including a shaft to receive a portion of the screw during rotation of the screw.

In disclosed examples, a device for controlling the motion of a door, including a screw nut configured to receive a screw, a bushing connected to the screw, wherein rotation of the bushing relative to the screw nut causes the screw to move into or out from the screw nut, and a piston connected to the bushing, wherein movement of the screw rotates causes the piston to move vertically such that the piston exerts pressure against a shear thickening fluid.

In some examples, the piston including a shim including one or more slots, and a piston head including one or more slots, wherein the shim is configured to rotate with respect to the piston head to adjust alignment between the one or more slots of the shim and the one or more slots of the piston head.

In some examples, a spacer plug to secure the shim to the piston. In examples, a knob adjuster that includes an extension configured to mate with the spacer plug, such that rotation of the knob adjuster rotates the shim relative to the piston head, thereby adjusting alignment between the one or more slots of the shim and the one or more slots of the piston head.

In some examples, the device is configured to be inserted into a hinge comprising a first hinge leaf and a second hinge leaf. In examples, the first hinge leaf includes a chamber filled at least in part with the shear thickening fluid, the piston arranged within the chamber.

In some examples, the second hinge leaf includes the screw nut, wherein when the first hinge leaf is rotated, the screw rotates such that the bushing and piston move vertically such that the piston exerts pressure against the shear thickening fluid.

The Linear Motion Control System

FIGS. 1-7B show views of a linear motion control system 10 (e.g., a pin) according to an embodiment of the present technology. The system 10 includes a generally cylindrical body 14 that includes a threaded outer portion 18 and a generally smooth outer portion 22. The threaded outer portion 18 is configured to be received in a nut 26. The threaded outer portion 18 and the nut 26 allow the system 10 to be threadably secured to any number of devices with respect to which the system 10 can be used to control motion. The body 14 defines an inner chamber 30.

Figure 2:
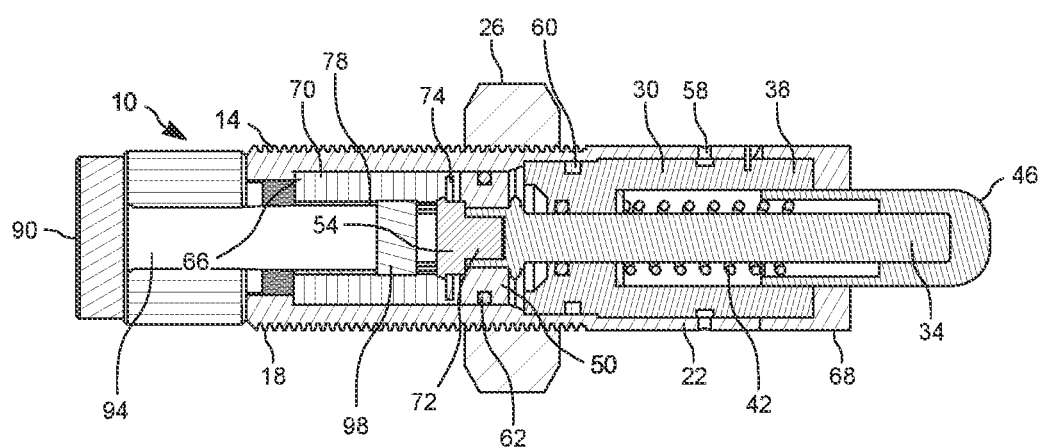
FIG. 2 is a cross-sectional side view of an example linear motion control system according to an embodiment of the present technology.
Figure 3A:
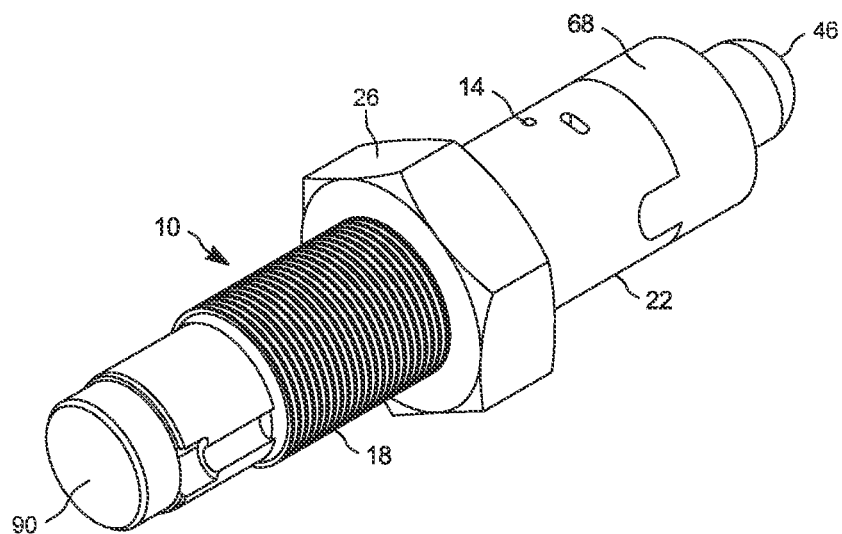
FIGS. 3A and 3B are isometric views of an example linear motion control system according to an embodiment of the present technology.
Figure 3B:
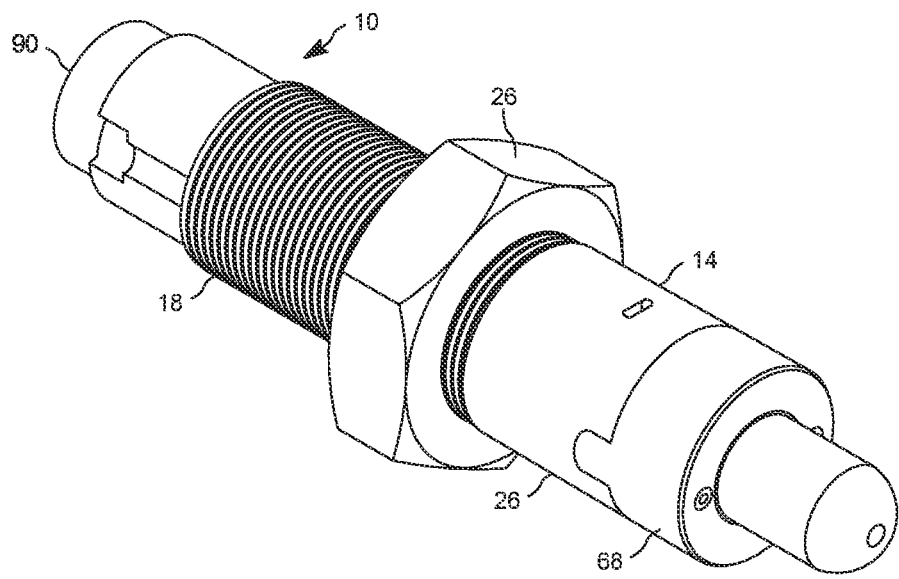
Figure 4A:
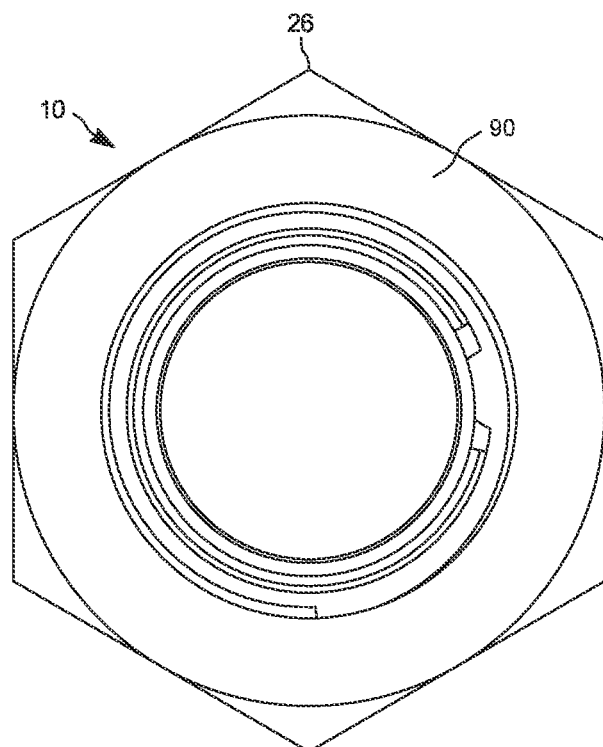
FIG. 4A is a top view of an example linear motion control system according to an embodiment of the present technology.
Figure 4B:
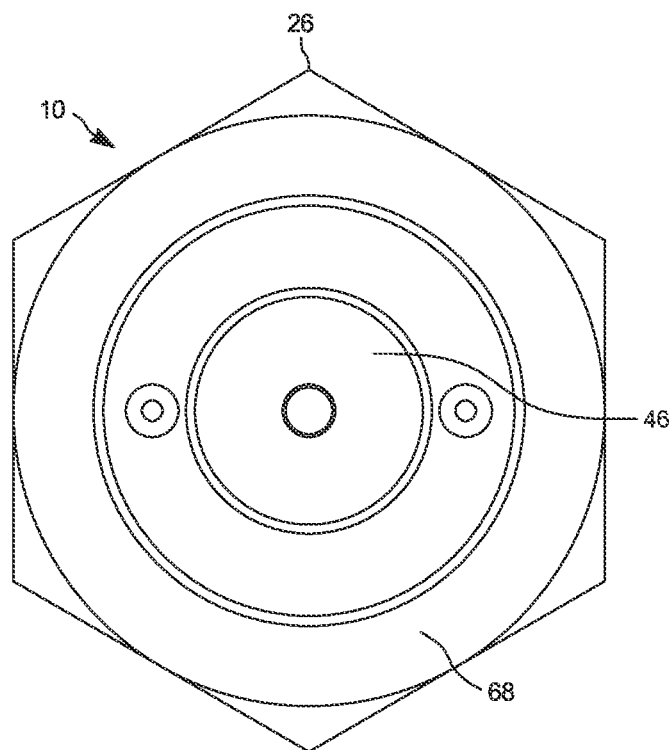
FIG. 4B is a bottom view of an example linear motion control system according to an embodiment of the present technology.

As shown in FIG. 2, the system 10 includes a piston plunger 34 that is inserted and held in place in the inner chamber 30 by a bushing 38. The system 10 includes a spring 42 that is inserted into a cavity in the bushing 38. A plunger cap or tip 46 is inserted into the bushing 38 and onto the plunger 34 such that the spring 42 is positioned in a cavity of the plunger cap 46. The bushing 38 serves as a guide for the plunger 34 and the plunger cap 46, and as a stop for the spring 42. The system 10 includes a piston head 50 that is positioned in the chamber 30 and that is connected to the plunger 34. The system 10 further includes a plug 54 that is connected to the plunger 34. The system 10 further includes a shim 74 that is mounted to a rod 78 that in turn is mounted to the plug 54.

Figure 5A:
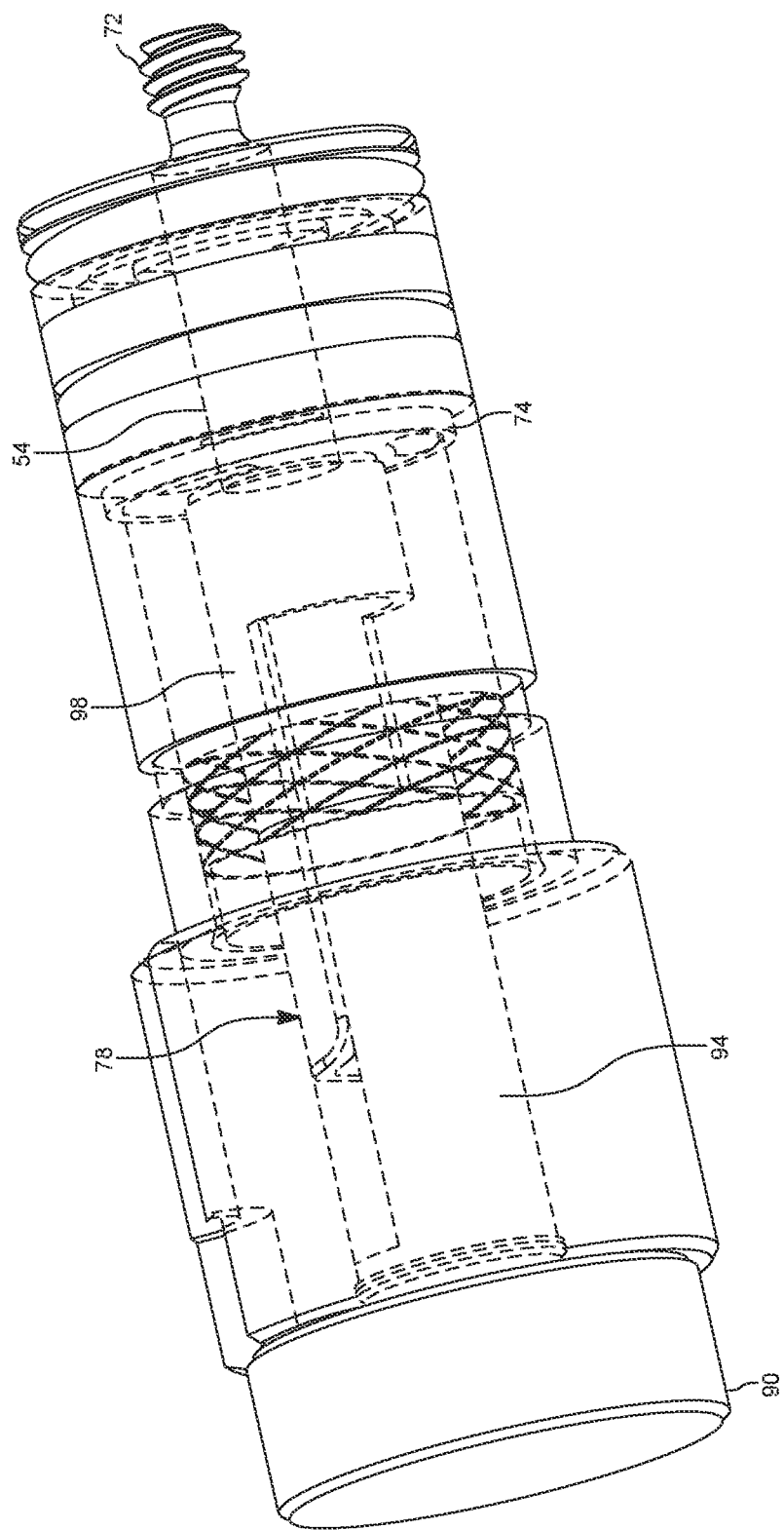
FIG. 5A is a side view of an example linear motion control system revealing internal components according to an embodiment of the present technology.
Figure 5B:
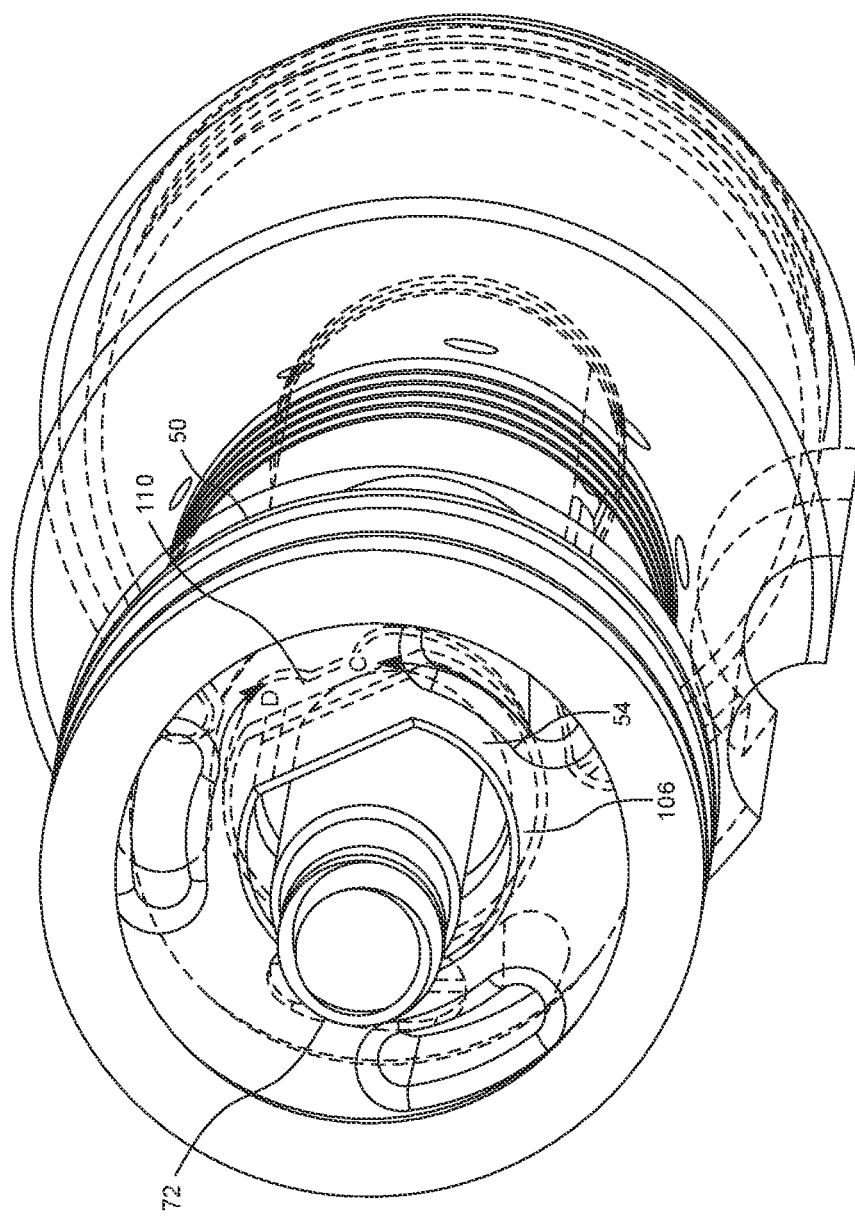
FIG. 5B is an isometric view of an example linear motion control system revealing internal components according to an embodiment of the present technology.

With reference to FIGS. 5A and 5B, the shim 74 has one or more slots 82 that generally match one or more slots 86 through piston head 50 in one or both of size and/or shape. Shim 74 includes a generally D-shaped hole 102, although additional or alternative holes and hole shapes are considered. The rod 78 is connected to a rotatable adjustment knob 90.

Figure 6:
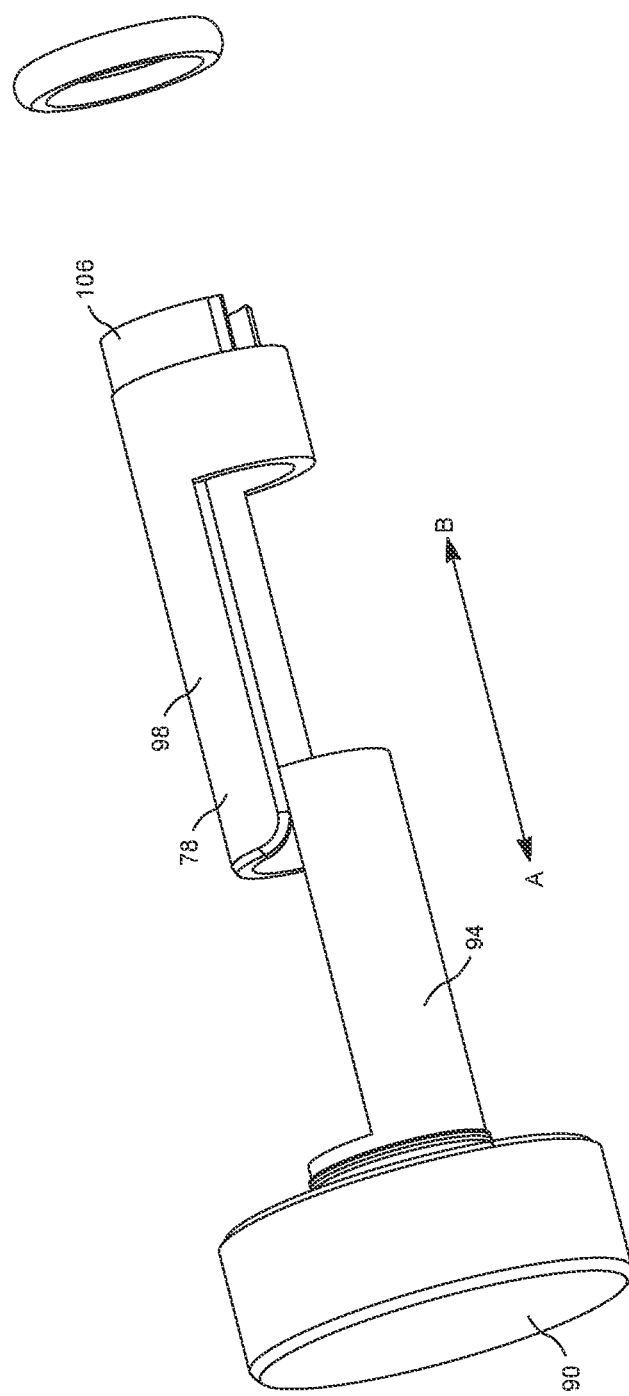
FIG. 6 is an isometric view of an example adjustment knob of a linear motion control system according to an embodiment of the present technology.

With respect to FIGS. 5A-6, the rod 78 includes first and second portions 94 and 98. The first portion 94 is connected to the knob 90. The first and second portions 94 and 98 can slide with respect to each other in the directions of arrows A and B. The second portion 98 includes a generally D-shaped lip portion 106 that is received in the hole 102 of the shim 74. The lip portion 106 of the second portion 98 receives a portion of the plug 54 that is connected to the plunger 34. As shown in FIGS. 5A and 5B, the plug 54 can includes threads 72 that allows for it to be threadably connected to the plunger 34. The lip portion 106 of the second portion 98 is rotatable with respect to the plug 54. The piston head 50 includes a counterbore with a protrusion 110. The lip portion 106 of the second portion 98 extends into the counterbore and the protrusion 110 limits how far the second portion 98 can rotate in the directions of Arrows C and D.

In some examples, the plug, lip portion, shim and piston head can be connected and oriented such that the blocking of further rotation of the lip portion in a first direction by the protrusion can indicate to the user that the slots of the shim and the slots of the piston head are aligned and that the blocking of further rotation of the lip portion in a second, opposite direction by the protrusion can indicate to the user that the slots of the shim and the slots of the piston head are not aligned. In some examples, the system includes an indicator (e.g. a visual, audible, tactile, etc.) that provides information regarding alignment of the slots of the shim and the slots of the piston head. For instance, one or more markers (e.g. lines, letters, numbers, graphics, colors, etc.) may be provided on the knob and/or a portion of the system to indicate an amount of resistance and/or alignment of the slots.

Returning to FIG. 2, a retaining ring 58 is placed onto an upper groove of the bushing 38 and O-rings 60 and 62 are placed into grooves in the bushing 38 and the piston head 50. A collar or nose guide 68 is secured to the bushing 38 to enclose the chamber 30 and retain the bushing 38 and plunger cap 46 in place. The collar 68 can be secured to the bushing 38 by a press fit or by any number of other means.

The portion of the chamber that does receive the bushing 38 defines a hydraulic chamber 66 that is filled with shear thickening or dilatant fluid 70. Shear thickening fluid ("STF", or dilatant material) is a Non-Newtonian fluid that stiffens when acted upon by pressure and/or speed. For example, the greater the speed and/or pressure, the stiffer the fluid becomes. When the speed and/or pressure is light, the fluid is flowable. When the speed and/or pressure is higher, it begins to act more like a solid.

In operation, the assembly 10 is threadably inserted into and connected to an object such that the assembly 10 can be used to control and dampen motion of devices that engage the object. For example, the assembly 10 could be used with industrial equipment to dampen the motion of one device that moves relative to and engages with another device. In that regard, the assembly 10 is positioned in the object so the plunger cap or tip 46 can be engaged by a moving device.

The amount of resistance to the movement of the device(s) can be adjusted by controlling the size of a slot through which the STF flows. For example, a user can rotate the knob 90 clockwise or counterclockwise to adjust how the slots 82 of the shim 74 align with the slots 86 of the piston head 50. Specifically, by turning the knob 90, the first rod portion 94 engages the second rod portion 98 and causes the second rod portion 98 to rotate. As the second rod portion 98 rotates, the shim 74 likewise rotates. The protrusion 110 of the piston head 50 limits how far the lip 106 of the second portion 98, and thus the shim 74, can be rotated in either direction. Rotation of the second portion 98 and the shim 74 does not cause the plug 54 or plunger 34 to rotate. Once the shim 74 has been rotated to the desired position, the plunger cap 46 is engaged by the moving device, and the plunger cap 46 is pushed into the body 14 and through the bushing 38 such that the plunger cap 46 pushes against the plunger 34 and spring 42. That action leads to the piston head 50 and shim 74 moving with respect to the fluid 70 in a direction toward the knob 90. The fluid 70 reacts to the force and speed of that impact and stiffens or remains flowable depending on the force applied and how the slots 82 and 86 are aligned. The movement of the plunger cap 46 also causes the second rod portion 98 to move toward the knob 90, such that the second rod portion 98 slides along the first rod portion 94 in the direction of Arrow A, as illustrated in FIG. 6.

The ability of the fluid 70 to resist the force of the depressed plunger cap 46 (and thus control the speed and/or force of the device contacting the cap 46) depends on the alignment of the slots 82 of the shim 74 and the slots 86 of the piston head 50. For example, if the shim 74 has been rotated to a first setting (e.g., by the user turning the adjustment knob 90) such that its slots 82 do not align with the slots 86 in the piston head 50, the fluid 70 will resist the movement of the piston plunger 34, and the plunger cap 46 will not depress. This, in turn, will cause an abrupt and hard stop to the device that contacts the plunger cap 46.

If, however, the knob 94 is turned to a second setting to align the slots 82 on the shim 74 with the slots 86 on the piston head 50, then the fluid 70 flows more easily between the shim 74 and the piston head 50 and does not resist movement of the plunger 34 and cap 46 as much. Thus, in this way, the compression of the fluid 70 is at its lightest setting. Of course, the knob 94 can be rotated to other positions besides the first and second positions to fine tune the setting of fluid 70 compression or resistance that the user desires for a particular application. The rotation in either direction is limited by the protrusion 110 that engages the second rod portion 98.

The reactivity to force of the fluid 70 lets the system 10 control the device engaging the plunger cap 46 due to the stiffening effect of the material make-up (e.g., a polymeric material) of the fluid 70. The fluid 70 also serves to control, in combination with the selection of the spring rate of spring 42, the return force from the plunger cap 46 so that it does not return to its fully extended position with such speed or force that it can damage the device that engages it. In that regard, the spring 42 returns the plunger 34 to its fully extended position with the combination of the selected spring rate and the engineered shear thickening fluid 70 controlling the rate of return, and thus not allowing a spring-back effect.

Figure 7A:
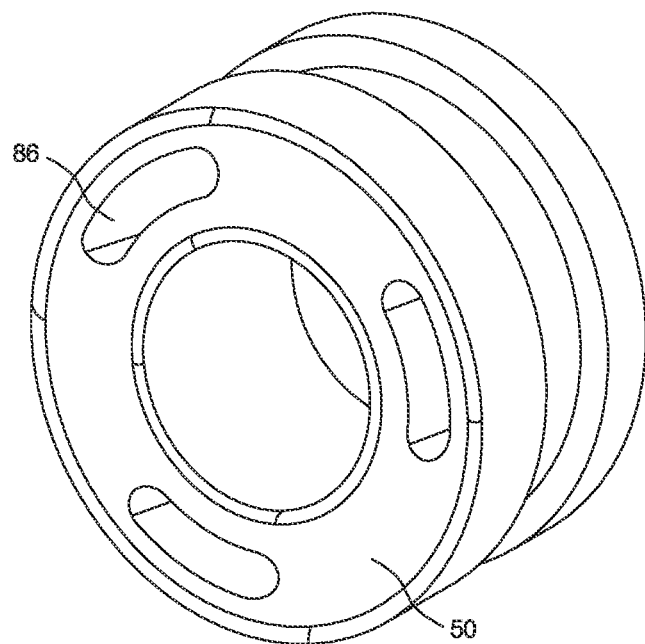
FIG. 7A shows an isometric view of an example piston head of a linear motion control system according to an embodiment of the present technology.
Figure 7B:
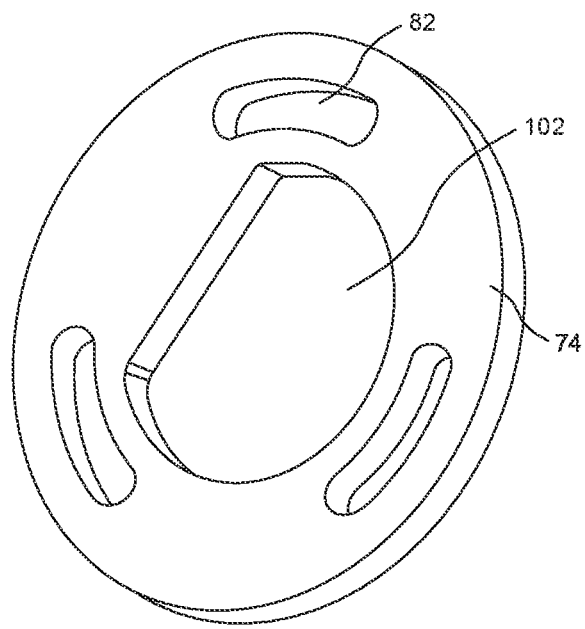
FIG. 7B shows an isometric view of an example shim of a linear motion control system according to an embodiment of the present technology.
Figure 8:
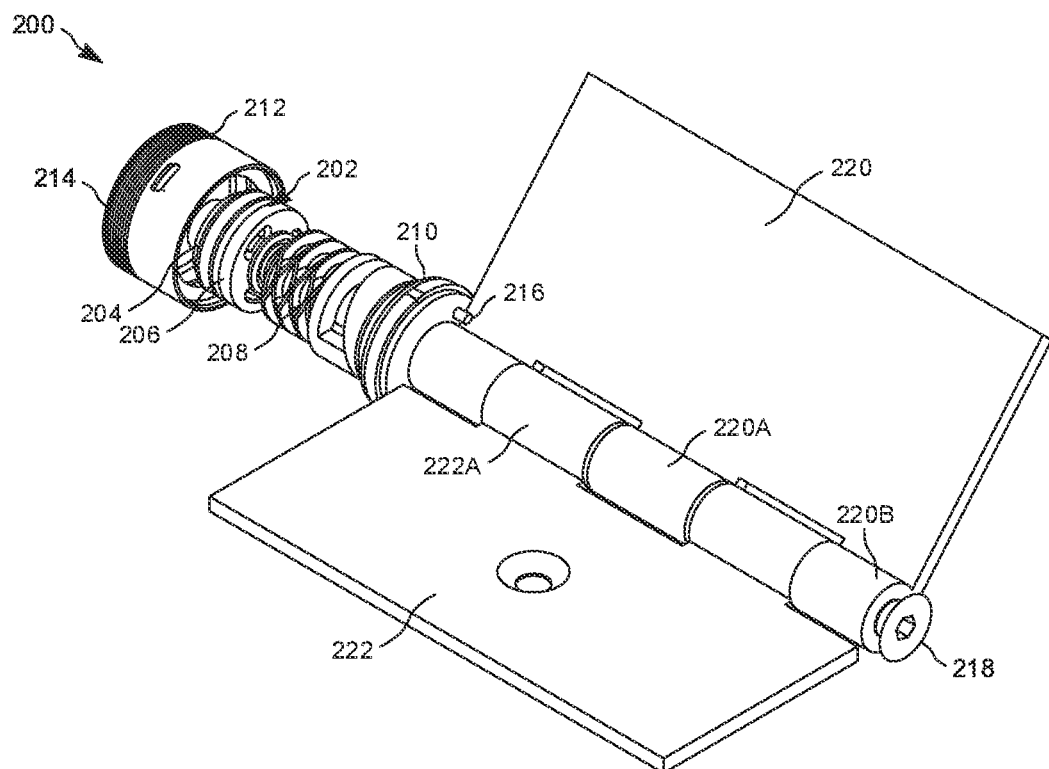
FIG. 8 is an isometric view of an example hinge pin assembly inserted into a hinge according to an embodiment of the present technology.
Figure 9:
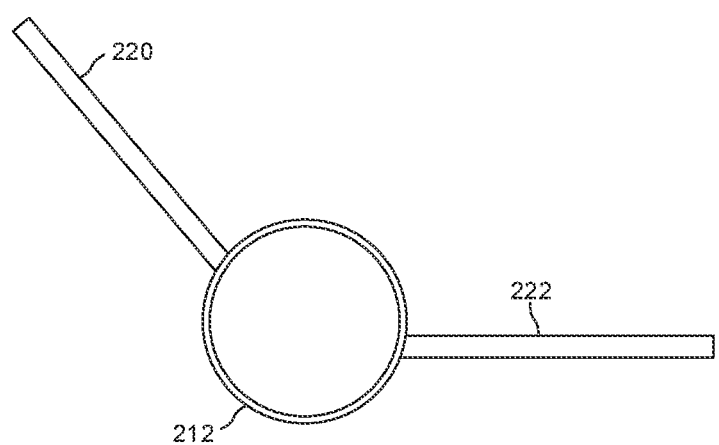
FIG. 9 illustrates a top view of example hinge pin assembly inserted into a hinge according to an embodiment of the present technology.
Figure 10:
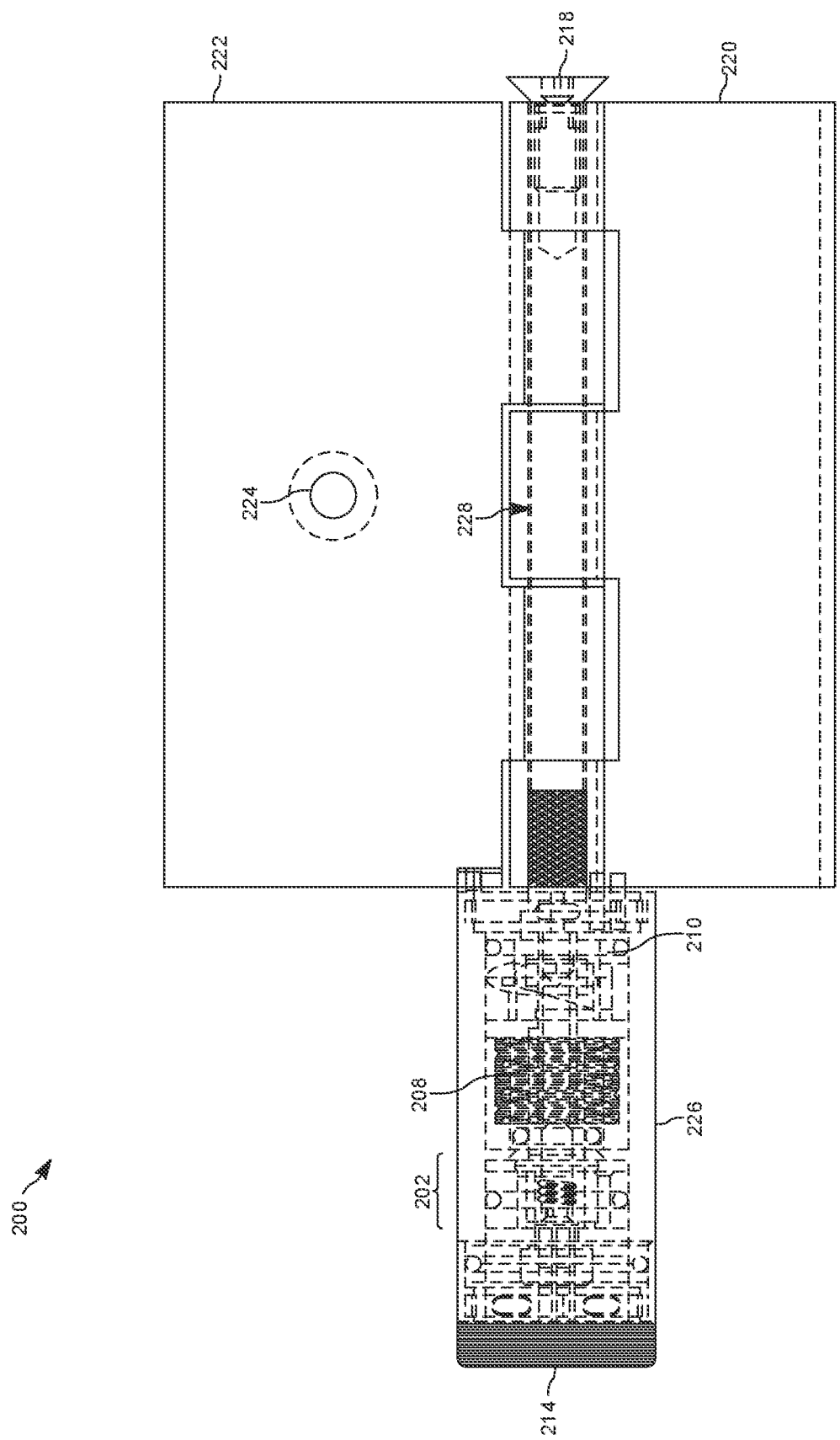
FIGS. 10 and 11 illustrate an example hinge pin assembly including a piston assembly, rebound shim, and piston cam according to an embodiment of the present technology.

With respect to FIG. 7A, the slots 86 of piston head 50 can be pitched with the wider part of the opening facing the fluid 70 and the narrower part on the backside of the piston head 50 such that the slots 86 are substantially "V" shaped. This structure can help the shear thickening fluid 70 stack up (stiffen) as the piston plunger 34 pushes through the fluid 70.

Additionally, the shear thickening fluid 70, as engineered, may have nanoparticles of a specific dimension that are mixed in a non-toxic carrier fluid or solvent. Force applied to the shear thickening fluid 70 results in these nanoparticles stacking up, thus stiffening and acting more like a solid than a flowable liquid. Examples of shear thickening fluid are disclosed or described in U.S. Pat. No. 7,825,045 and U.S. Published Application No. 2020/0011110 (U.S. patent application Ser. No. 16/502,470), which are incorporated herein in their entireties by reference.

The particles of shear thickening fluid 70 may be, by way of example, oxides, calcium carbonate, synthetically occurring minerals, naturally occurring minerals, polymers, or a mixture thereof. The particles may also be, by way of example, $SiO_2$, polystyrene, or polymethylmethacrylate. The solvent may be, by way of example, water, which may contain salts, surfactants, and/or polymers. The solvent may also be, for example, ethylene glycol, polyethylene glycol, ethanol, silicon oils, phenyltrimethicone or a mixture thereof. In some examples, the particles may have an average diameter size that is less than 1 millimeter, and may have an average diameter size of less than 100 microns. By way of example, the shear thickening fluid 70 may be made of silica particles suspended in polyethylene glycol. By further way of example, silica particles may suspended in the polyethylene glycol at a volume fraction of approximately 0.57. The silica particles may have an average particle diameter of approximately 446 nm. The fluid may have a shear thickening transition at a shear rate of approximately 102-103 s-1.

Again, a simple rotation of the knob 90 allows the user to control the valve sensitivity based on the feel they want when closing the door. Turning the knob 90 to the first position locks the plunger cap 46 and stops movement of the device that engages the plunger cap 46 because the shim 74 blocks shear thickening fluid 70 from passing to the slots 86 the piston head 50. Turning the knob to the second position allows the plunger cap 46 to move at a controlled speed because the slots 82 on the shim 74 are generally aligned with the slots 86 on the piston head 50, allowing the fluid to pass through the piston head 50. However, the fluid still reacts to speed and pressure. Therefore, the system still controls the movement of the device engaging the plunger cap 46.

The shim 74 may float on the lip portion 106 of the rod 78, such that the shim 74 is not in a fixed position with respect to the piston head 50. Thus, the shim 74 can press against the piston head 50 when the shear thickening fluid 70 is being compressed, and pull away from the piston head 50 when the plunger 34 rebounds back to its extended position. Alternatively, the shim 74 may be held in a fixed position with respect to the piston head 50 and/or in contact with the piston head 50, but still be rotatable with respect to the piston head 50 via turning of the knob 90.

The Pin System

FIGS. 8 to 31 illustrate an example pin system (also referred to as a "SlamBlok Pin") that is configured to replaces a hinge pin in a door hinge and that controls the slamming of a door.

Figure 11:
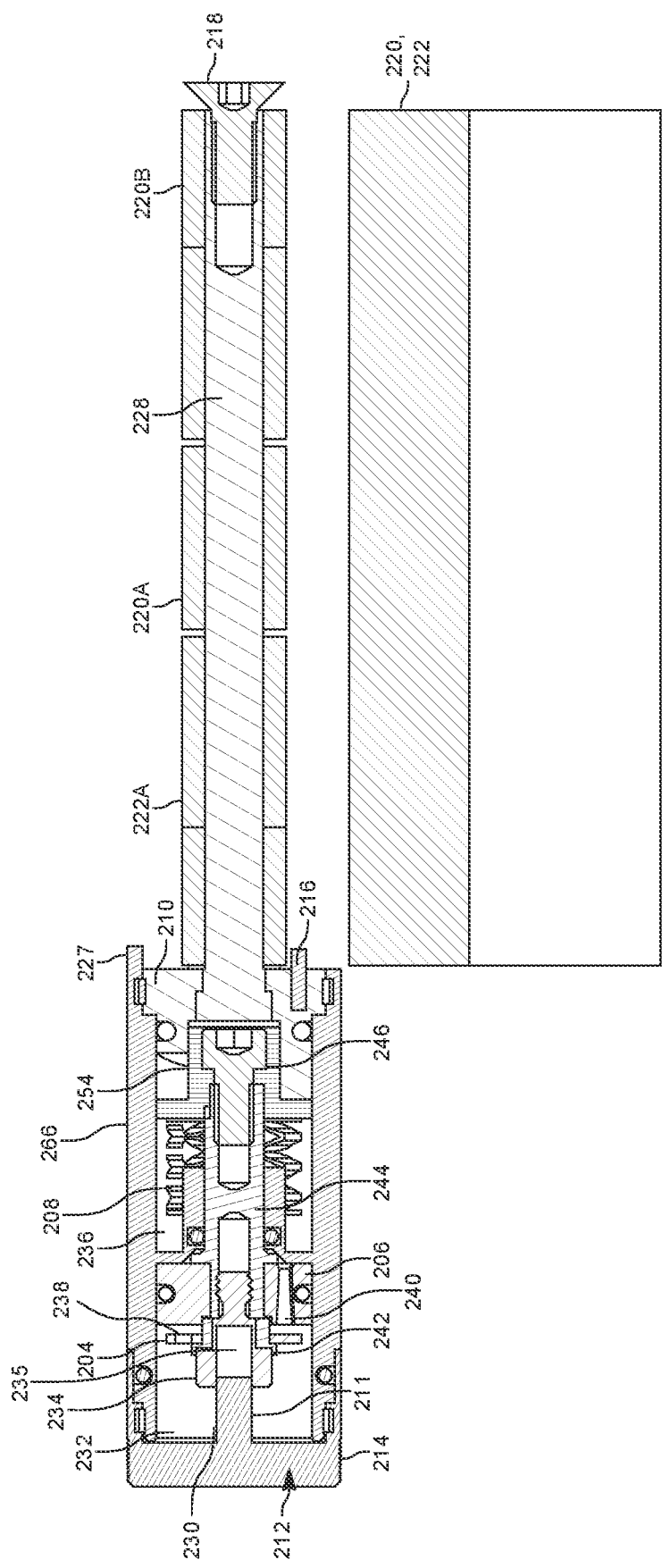

As shown in FIGS. 8-11, a hinge pin assembly 200 includes one or more of a piston assembly 202 which includes a rebound shim 204 and a piston head 206. The piston assembly 202 is configured to control movement of the pin assembly 200 by applying force against a STF 230 within a chamber 232 (e.g., within a body or chamber housing 226, as shown in FIG. 11). A cap 212 includes a cap adjuster 214, by which an operator may rotate the shim 204 relative to the piston head 206 to change an amount of overlap between shim slots 238 and piston slots 240. As the amount of overlap between slots 238 and 240 changes, the size of a channel through which the STF 230 may flow changes, thereby modifying the resistance the piston assembly 202 meets when pressing against the STF 230.

The first and second leaves 220, 222 may include first and second hinge knuckles 220A and 222A, respectively, through which a pin 228 may be inserted. A fastener 218 is configured to secure the pin assembly 200 in place once inserted through the first and second hinge knuckles 220A and 222A. The leaves 220 and/or 222 may include one or more fasteners or screw holes 224 to facilitate securing the hinge to a door.

A hinge cam 210 is arranged at an edge of a hinge that includes first and second leaves 220 and 222, with a dowel 216 extending from the hinge cam 210 to force rotation of the hinge cam 210 relative to rotational movement of the leaves. The chamber housing 226 includes one or more protrusions 227 that extend toward the hinge. In some examples, the one or more protrusions 227 contact the hinge leaf 222, such that the chamber housing 226 moves along with rotation of leaf 222. The dowel 216 contacts the hinge leaf 220, such that the hinge cam 210 moves with rotation of leaf 220.

In some examples, the piston assembly 202 rests within the cap 212 when leaves 220 and 222 are in contact (e.g., when a corresponding door is closed). A spring 208 is arranged in chamber 236 and biased against the cam follower 254, forcing the cam follower 254 towards the hinge cam 210 as a raised portion 252 (FIG. 13) of the hinge cam 210 rotates. Relative rotation increases the distance between leaves 220 and 222 (e.g., upon opening of the door) while the cam follower 254 is forced away from the cap 212, thereby creating space between the piston assembly 202 and the adjustment cap 214.

As the hinge cam 210 rotates in response to rotation closing the distance between the leaves 220 and 222 (e.g., as the door closes), the hinge cam 210 rotates, which causes the cam follower 254 to move toward the cap 212, forcing the piston assembly 202 toward the cap 212. As shim 204 and piston head 206 move against the STF 230, the resistance to the movement is controlled by the amount of alignment between the slots 238 and 240. In some examples, STF 230 can flow around edges of the shim 204 and/or through the slots 238.

In some examples, the shim 204 may float on a generally D-shaped lip portion 237 of the plug 242, such that the shim 204 is not in a fixed position with respect to the piston head 206. Thus, the shim 204 can press against the piston head 206 when the shear thickening fluid 230 is being compressed, and pull away from the piston head 206 when the assembly 202 rebounds back to its closed position. Alternatively, the shim 204 may be held in a fixed position with respect to the piston head 306 and/or in contact with the piston head 306, but still be rotatable with respect to the piston head 306 via turning of the cap adjuster 214.

The movement of the cam follower 254 also forces the spring 208 to compress, thereby forcing maintained contact between the cam follower 254 and the hinge cam 210 in preparation for another rotation.

Figure 12:
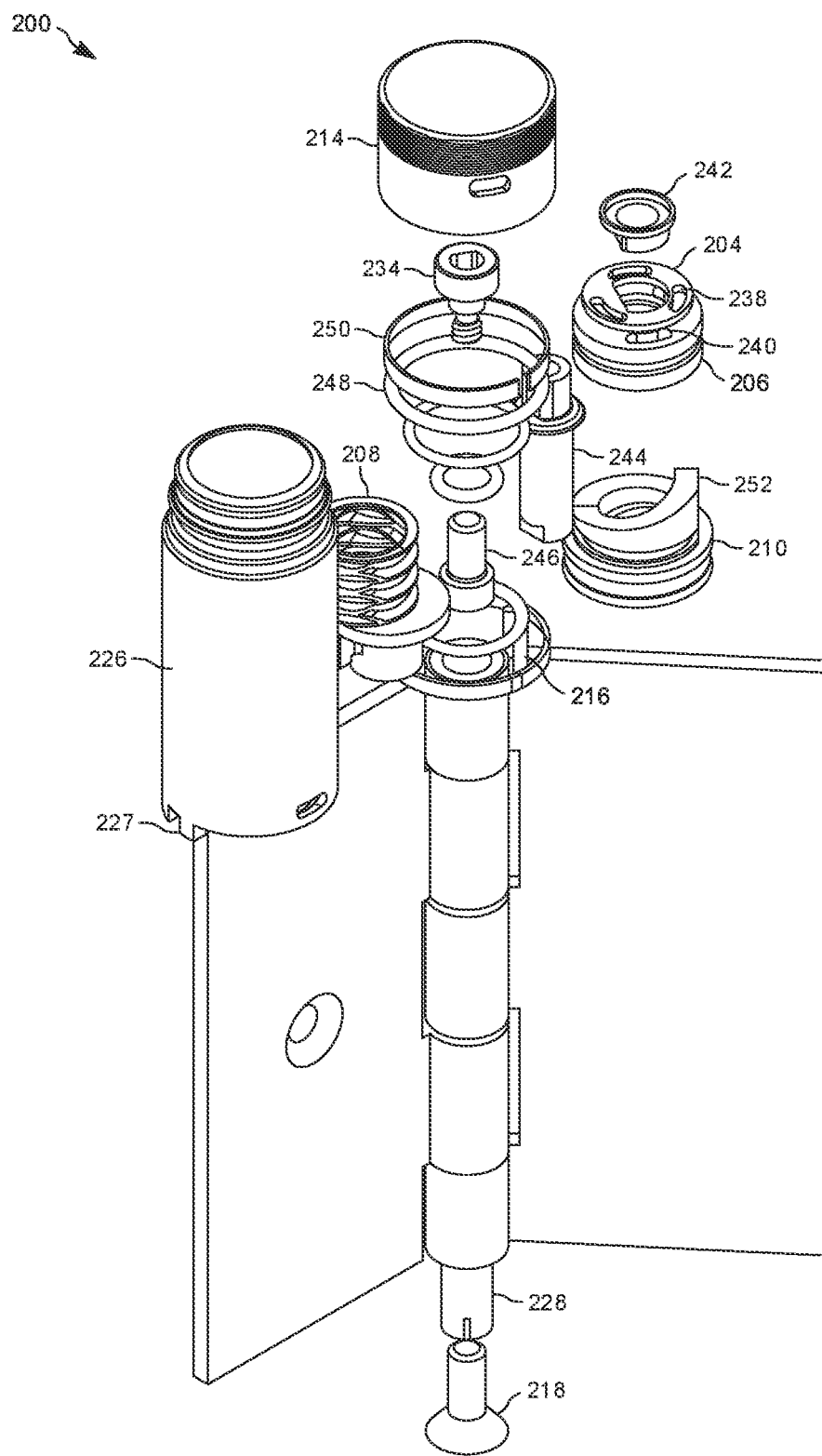
FIGS. 12 and 13 illustrate an exploded view of an example hinge pin assembly according to an embodiment of the present technology.
Figure 13:
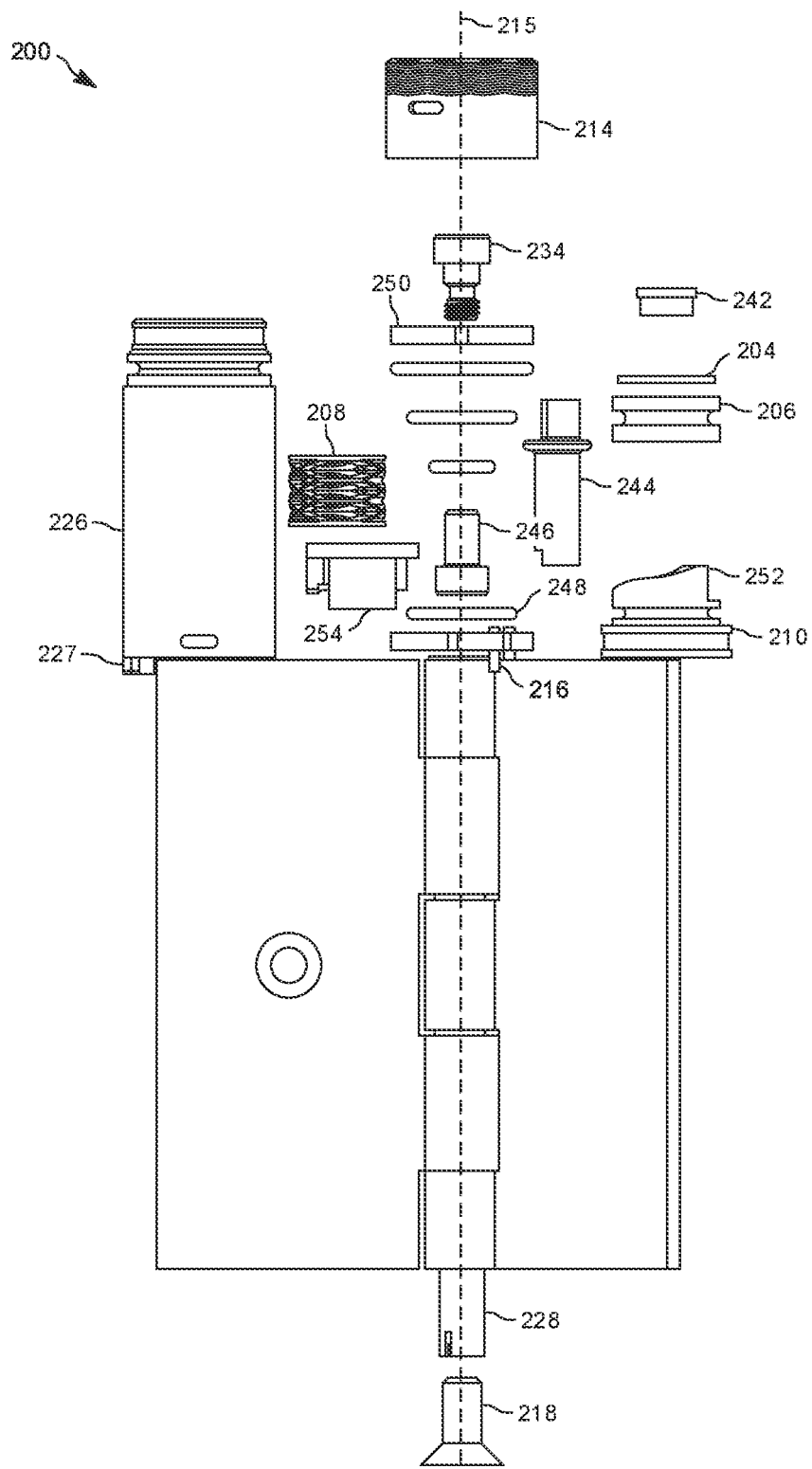
Figure 14:
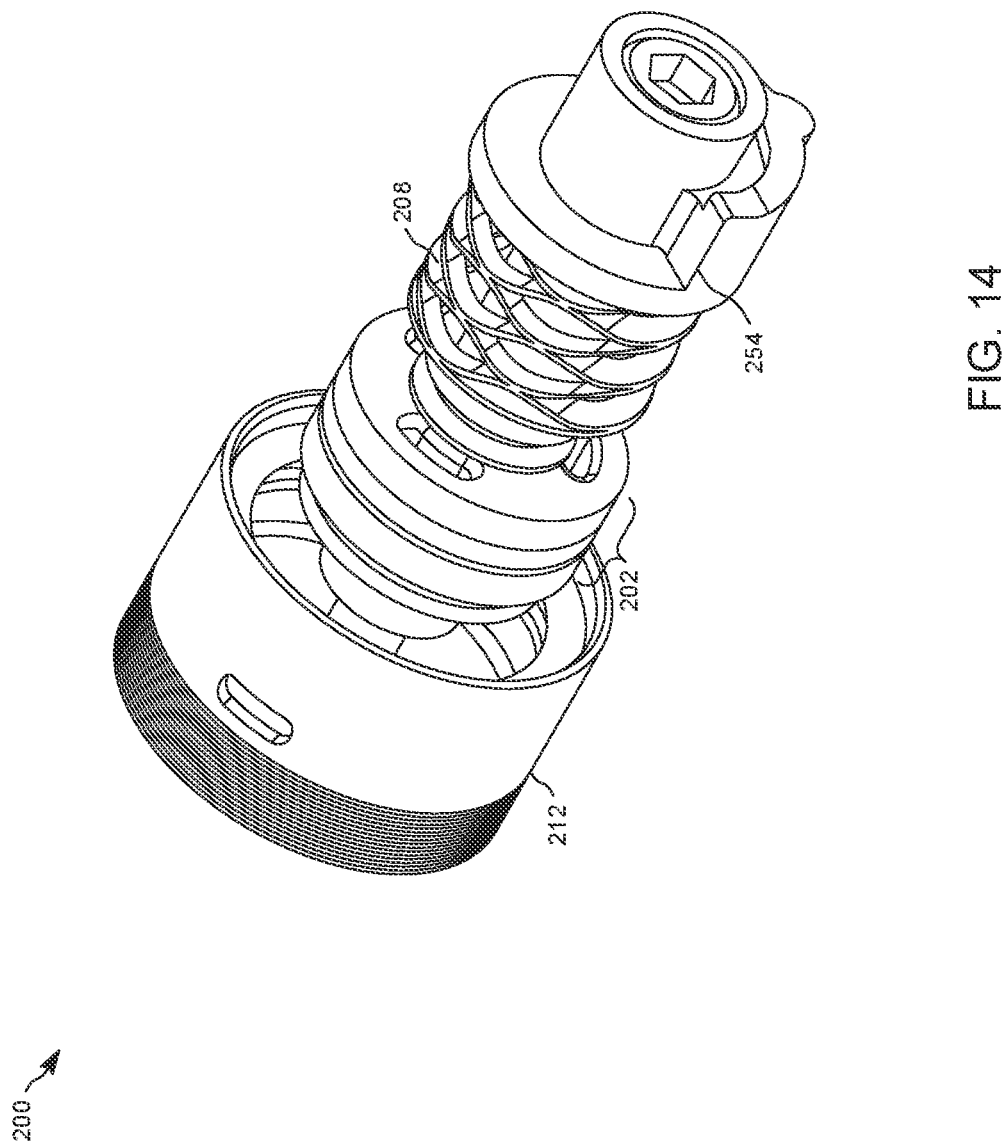
FIGS. 14-18 illustrate an example chamber housing configured to contain movable parts of the hinge assembly according to an embodiment of the present technology.
Figure 15:
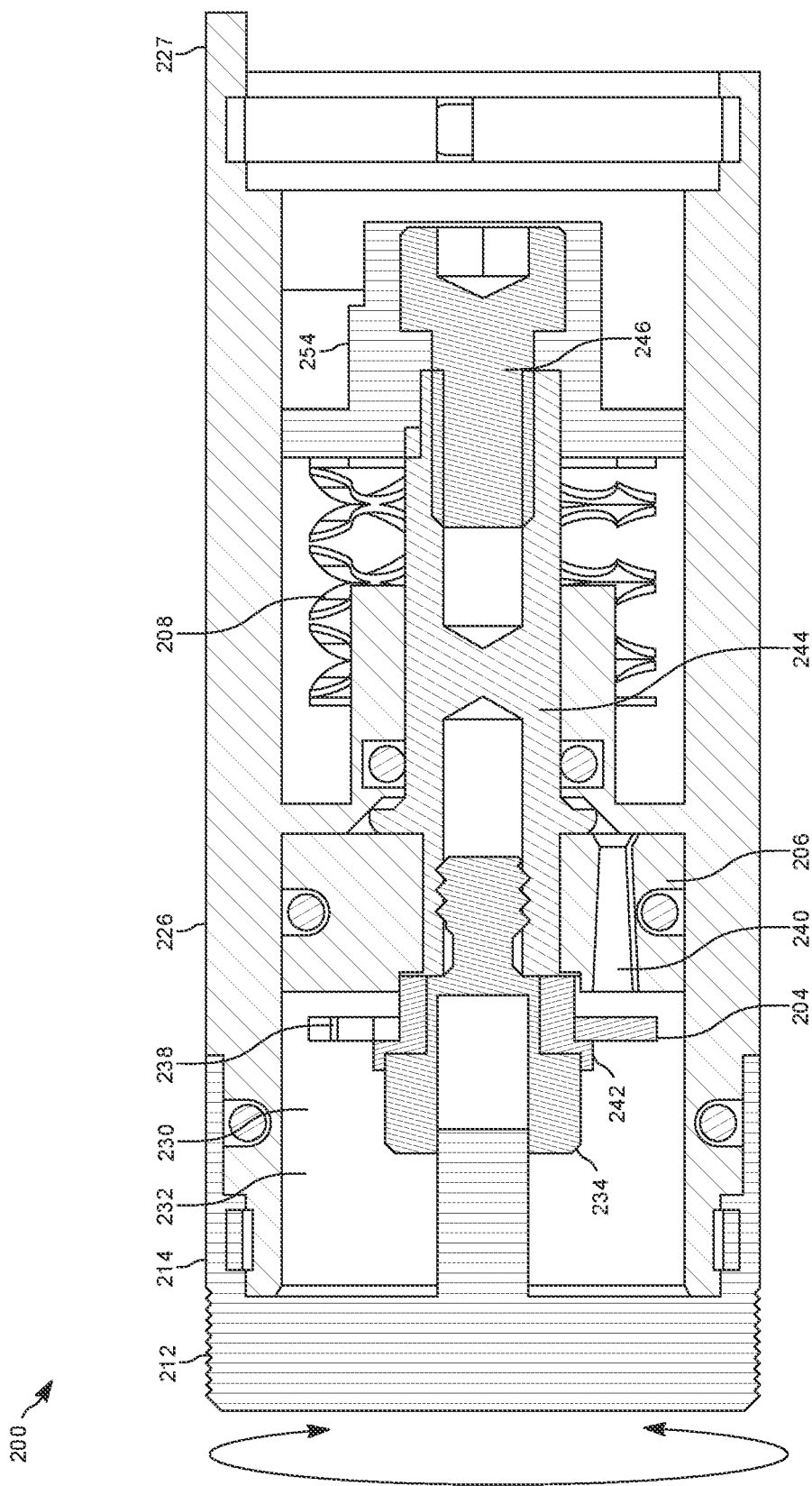
Figure 17:
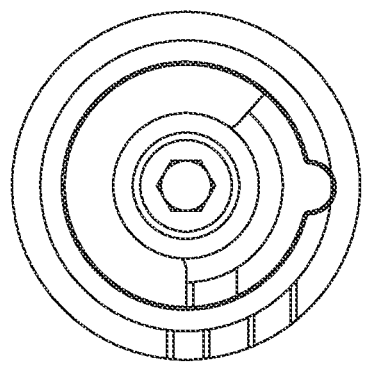
Figure 16:
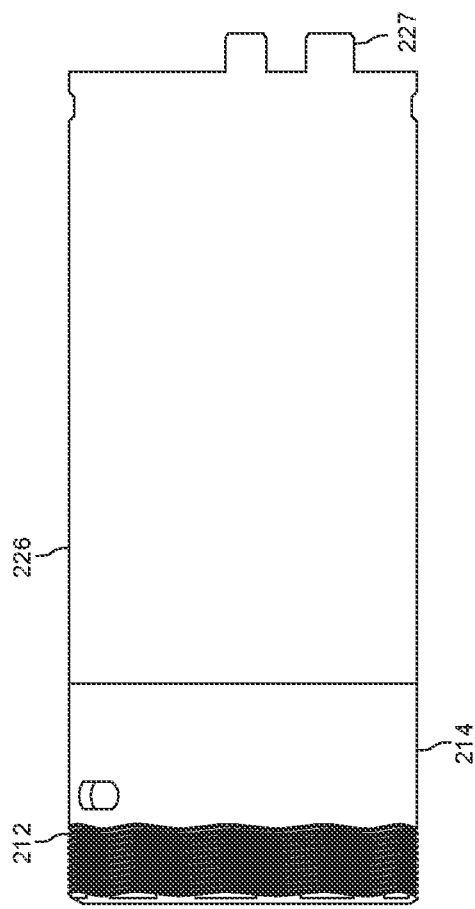
Figure 18:
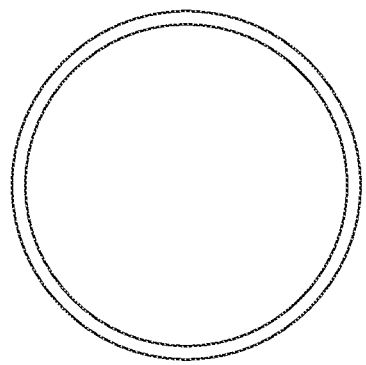
Figure 19:
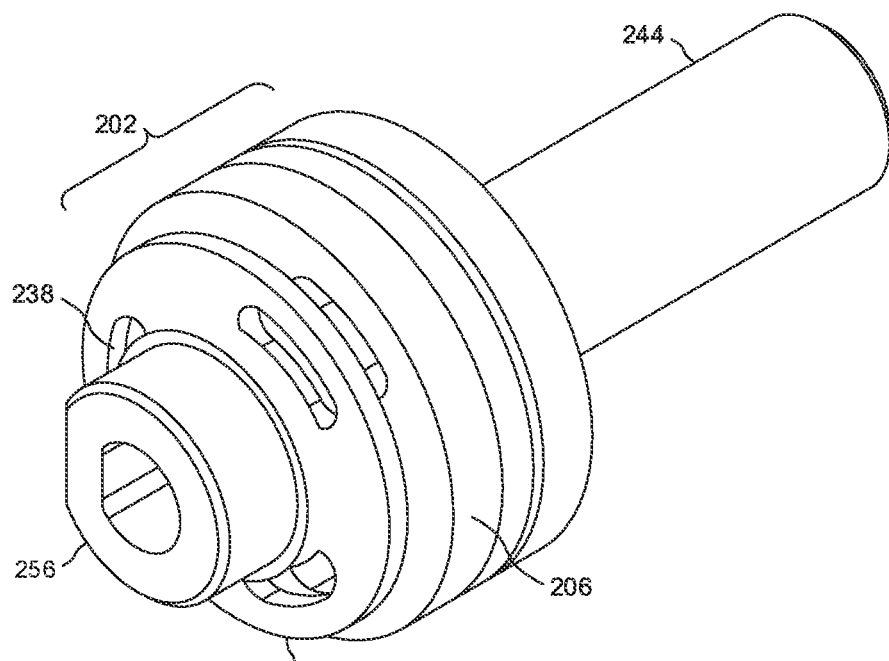
FIGS. 19-24 illustrate an example piston assembly according to an embodiment of the present technology.
Figure 20:
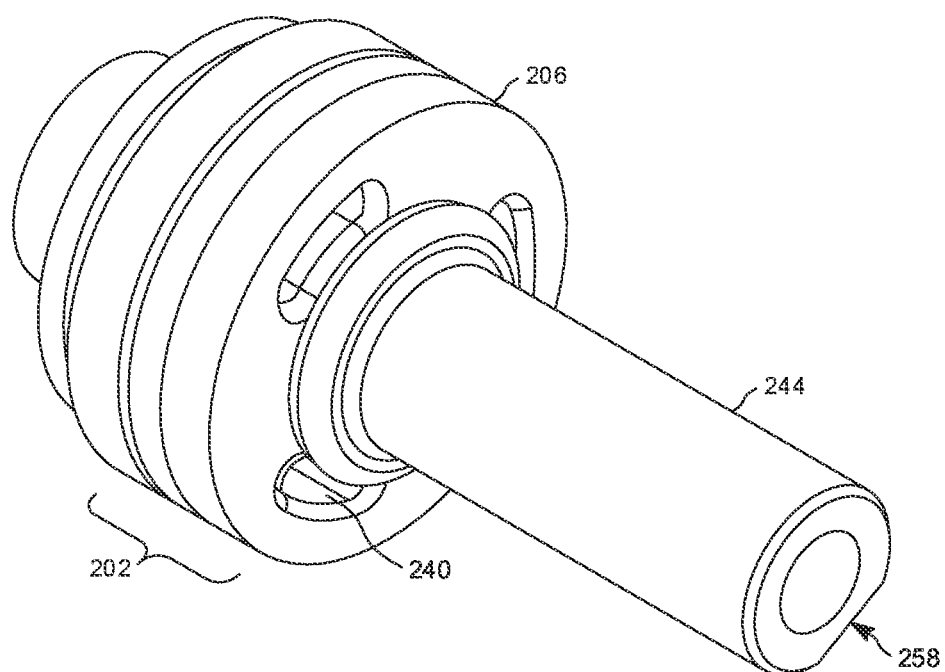
Figure 23:
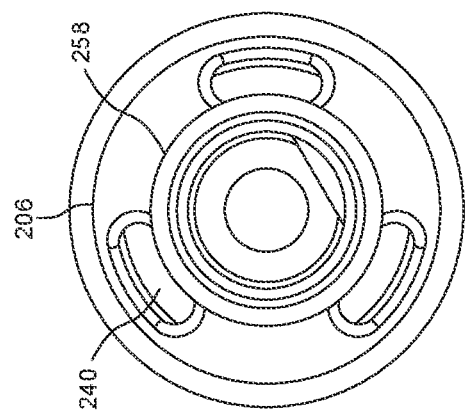
Figure 21:
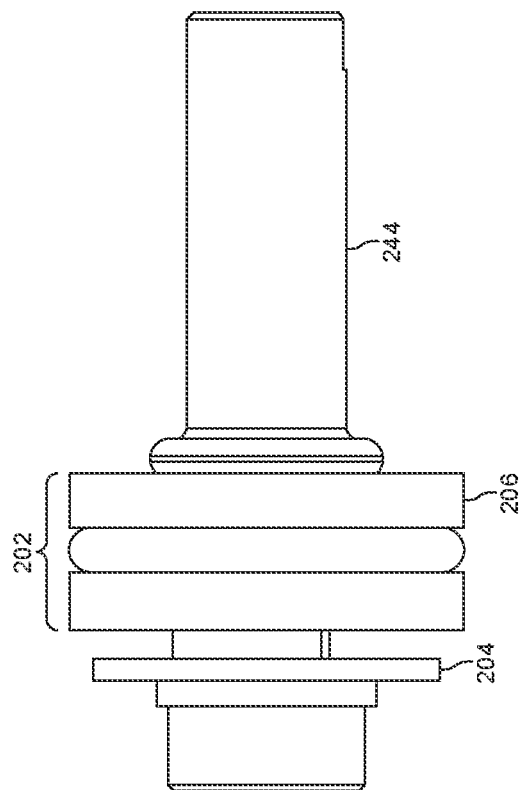
Figure 22:
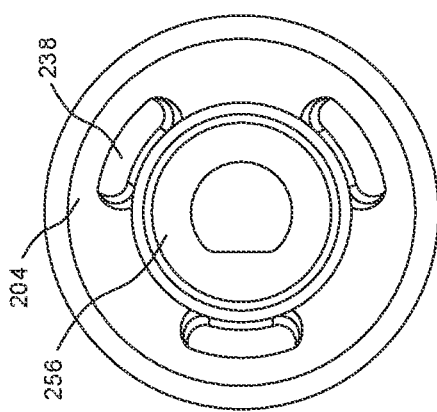

With reference to FIGS. 12 and 13, the piston head 206 is mounted to a plunger shaft cam 244. A shoulder bolt 234 is configured to screw into the plunger shaft cam 244. The piston head 206 is mounted to the plunger shaft cam 244 and a rebound spacer plug 242 is positioned between the shoulder bolt 234 and the piston head 206. Shim 238 is mounted to the plug 242 and spaced axially from the piston head 206. A D-shaped rod 211 of the cap adjuster 214 mates with the shoulder bolt 234 such that rotation of the cap adjuster 214 causes rotation of the plug 242 and thus the shim 204, which allows the user to adjust the amount of alignment between the shim 204 and the piston head 206. The cam follower 254 is secured to the plunger shaft cam 244 via a fastener 246. The pin 228 extends through the hinge cam 210 and is secured in place by the fastener 218. The cap adjuster 214 is configured to rotate about a central axis 215.

FIGS. 14-18 illustrate the chamber housing 226 as configured to contain movable parts of the assembly 200. For example, the piston assembly 202 is housed within the chamber 232 of the chamber housing 226, such that the piston assembly 202 moves along the central axis 215 defined by the pin 228 (FIG. 13).

As shown in FIGS. 19-24, the piston assembly 202 is secured to the plunger shaft cam 244 by shoulder bolt 234. The plunger shaft cam 244 includes a shoulder bolt D-driver 256 configured to mate with threaded portion 260 of shoulder bolt 234, which is configured to accept the D-shaped rod 211 (FIG. 11) of the cap 212 as the piston assembly 202 moves toward and/or away from the adjustable cap 214 in response to rotational movement of the hinge cam 210. At an opposite end of the plunger shaft cam 244 is an end portion 258 manufactured to mate with fastener 246 (FIG. 11).

As disclosed herein, a position of slots 238 in the shim 204 can be adjusted relative to slots 240 in the piston head 206, creating a channel of adjustable size through which STF 230 flows. For example, when slots 238 and 240 are substantially aligned, a maximum amount of STF 230 may flow therethrough as the piston assembly 202 moves towards the cap 212. As the slots 238 and 240 become more out of alignment, the channel narrows, causing the STF 230 to flow less readily, thereby increasing resistance and slowing movement of the hinge cam 210 and piston assembly 202 toward the cap 212 and, therefore, slowing the rotation of the leaves 218 and 220 toward each other.

Figure 24:
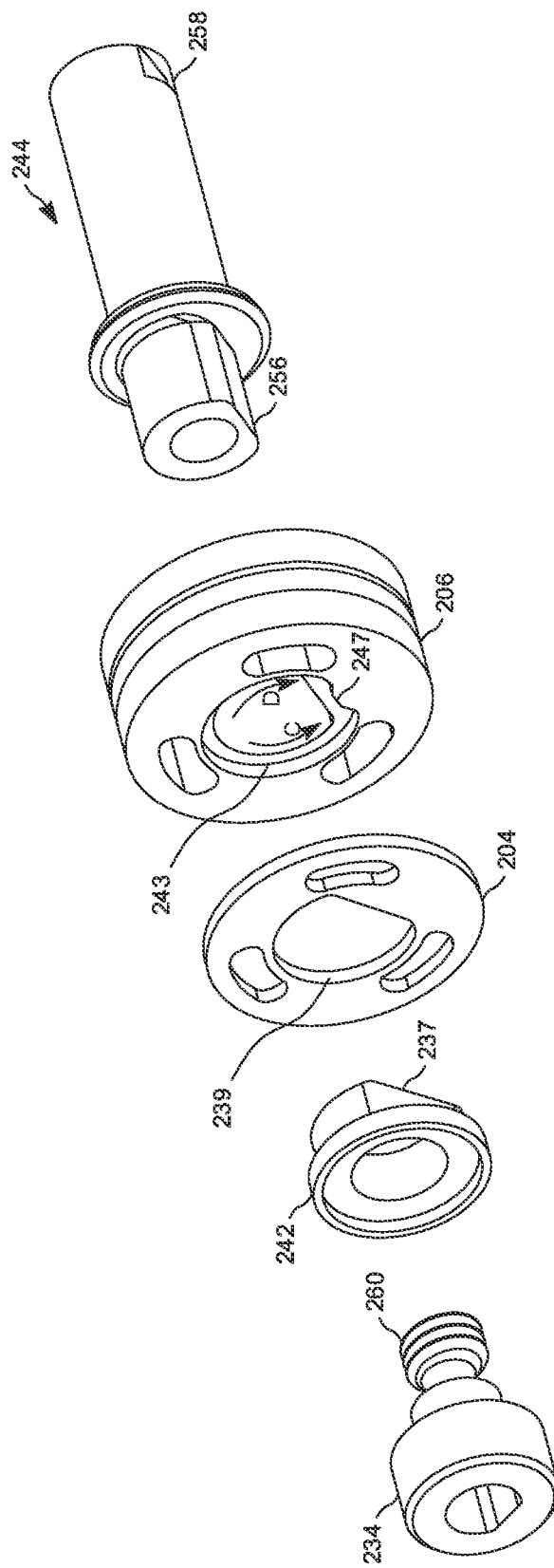
Figure 25:
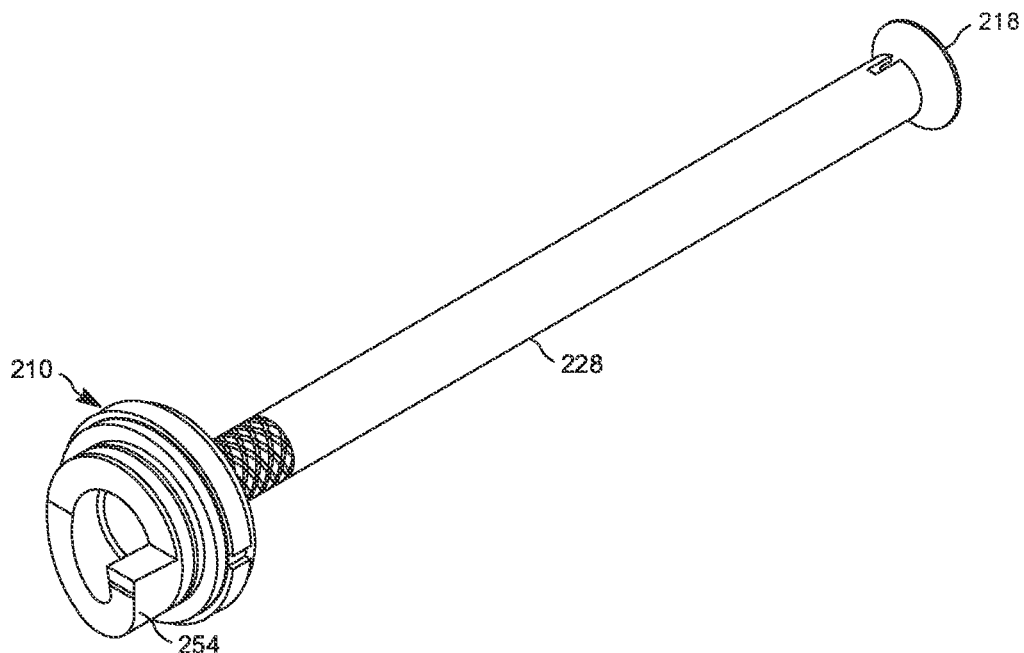
Figure 26:
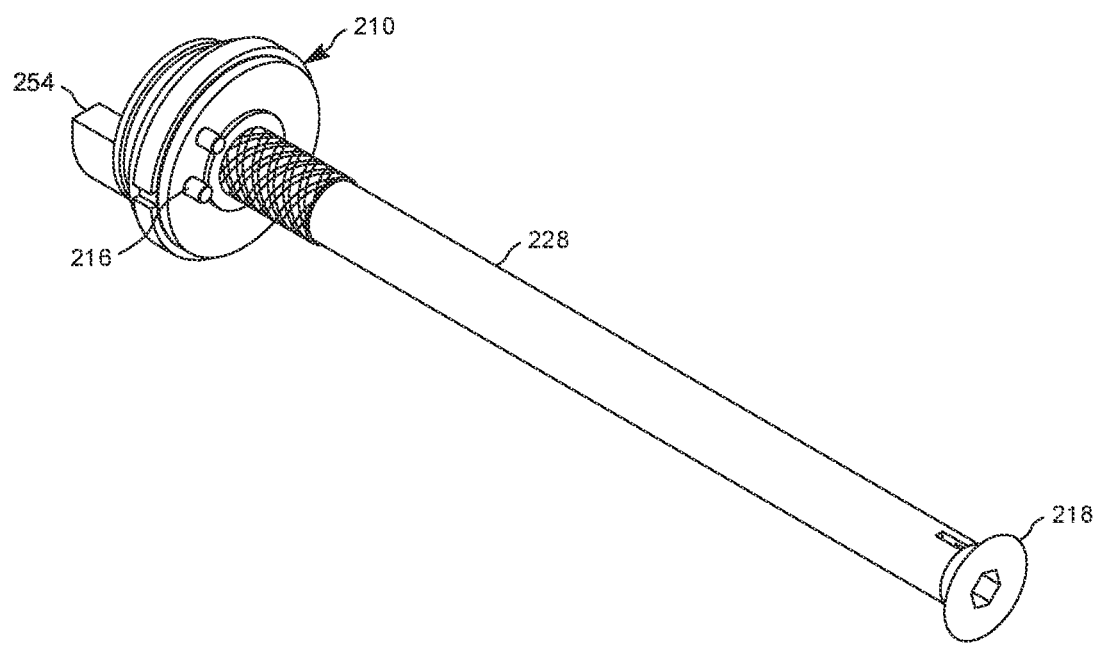
Figure 27:
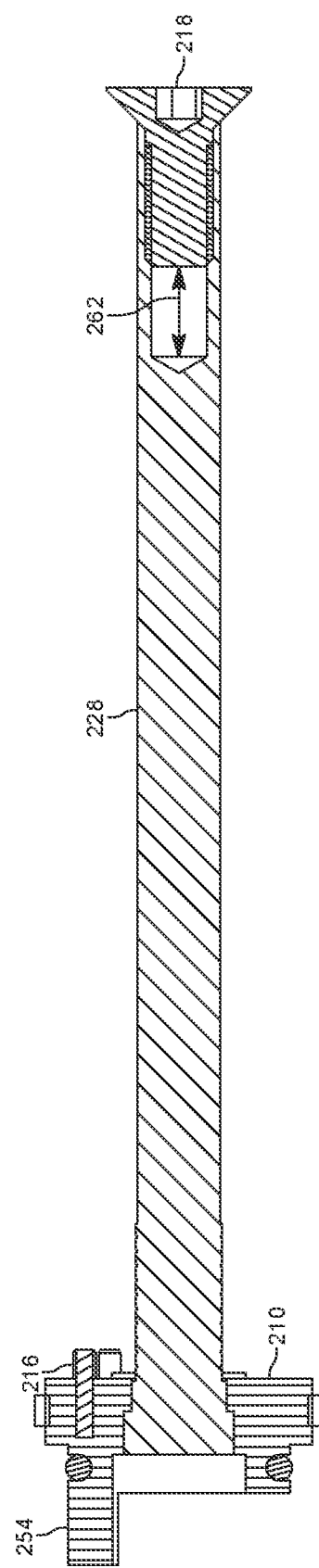
Figure 33:
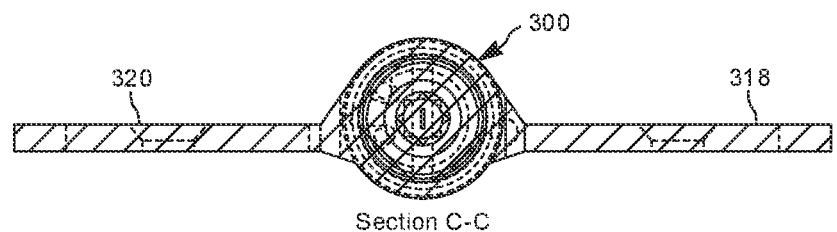
FIG. 33 is a top view of an example hinge system incorporated in a hinge according to an embodiment of the present technology.

With respect to FIG. 24, the plug 242 includes a generally D-shaped lip portion 237 that is received in the hole 239 of the shim 204. The lip portion 237 of the plug 242 is received in counterbore 243 of the piston head 206. As shown in FIG. 24, the shoulder bolt 234 includes threads 260 that allows for it to be threadably connected to the shoulder bolt D-driver 256 of plunger shaft cam 244. The lip portion 237 of the plug 242 is rotatable with respect to the piston head 206. For example, the lip portion 237 extends into the counterbore 243 and a protrusion 247 extends into the counterbore 243 to limit how far the lip portion 237 (and thereby the shim 204) can rotate in the directions of Arrows C and D when the cap adjuster 214 is rotated.

In some examples, the plug, lip portion, shim and piston head can be connected and oriented such that the blocking of further rotation of the lip portion in a first direction by the protrusion can indicate to the user that the slots of the shim and the slots of the piston head are aligned and that the blocking of further rotation of the lip portion in a second, opposite direction by the protrusion can indicate to the user that the slots of the shim and the slots of the piston head are not aligned. In some examples, the system includes an indicator (e.g. a visual, audible, tactile, etc.) that provides information regarding alignment of the slots of the shim and the slots of the piston head. For instance, one or more markers (e.g. lines, letters, numbers, graphics, colors, etc.) may be provided on the knob and/or a portion of the system to indicate an amount of resistance and/or alignment of the slots.

FIGS. 25-30 illustrate an example hinge cam 210 secured to pin 228. As shown, the pin 228 extends through the hinge cam 210, which is secured in place by fastener 218 (e.g., when inserted into the knuckles 220A and 222A). One or more dowels 216 are inserted into the hinge cam 210 and extend from a surface of the hinge cam 210 toward the pin 228. The dowel(s) 216 are configured to engage a hinge leaf (e.g., a dowel 216 is positioned against a leaf) and respond to rotational movement of the leaf.

With reference to FIG. 11, chamber housing 226 contains the STF 230 in this first or upper chamber 232 and the hinge cam 210 and spring 208 are in the second or lower chamber 236. The hinge cam 210 turns the rotary motion of the hinge pin 228 (which is caused to rotate by a rotating leaf engaging the dowels 216) into linear motion, thus driving the plunger shaft cam 244 toward the cap 212 and into the upper chamber 232 through the STF 230. Slots 240 in piston head 206 allow STF 230 (such as that described above with respect to the linear motion control device) to flow through them at a rate determined by the adjustment of the rebound shim 204 that can be rotated to leave open, partially cover, or fully cover the slots 238. When the slots are fully covered, the system is in a locked-out position in which the piston cannot travel and, thus, the door cannot be closed.

The pin 228 retains the assembly 200 in the hinge body. In order to install the assembly 200, the user removes an existing hinge pin in the knuckles 220A and 220B of the door hinge. The pin 228 of the assembly 200 can then be inserted into the hinge knuckles 220A and 220B with the keyed portion of the bottom of the chamber housing 226 fitting over the leaf 220, 222 of one of the hinge plates. The pin tightening screw 218 is then tightened which slightly flares the bottom of the pin 228, securing it to the bottom portion of the opposite hinge leaf (where chamber housing 226 is keyed and secured). In some examples, the arrangement of the pin 228 is fixed relative to one or both of knuckle 220B and hinge cam 210.

Since the chamber housing 226 and the pin 228 are secured to separate hinge leaves 220, 222, as the door closes, one hinge leaf rotates relative to the other, which causes the pin 228 which is secured to the hinge cam 210, to rotate relative to the chamber housing 226. The hinge cam 210 then rotates, which causes the cam follower 254 to push the assembly of 202 (including plunger shaft cam 244 and shoulder bolt 234 and shim 204) though the upper chamber 232 that is filled with STF 230. Due to the properties of the STF 230, the assembly 202 is met with resistance as it is pushed into the upper chamber 232, slowing the advancement of the assembly 202 and thereby slowing rotational movement of the door.

The resistance on the shim 204 from the STF 230 may cause the shim 204 to move to or away from the plunger head 206. For example, as the assembly 202 moves toward cap 212 within the chamber 232, the shim 204 may be forced toward or against the plunger head 206. In the case that slots of the shim 204 and the plunger head 206 are out of alignment, the STF 230 may significantly slow movement of the assembly 202.

When the door is opened, the piston assembly 202 reverses itself and the shim 204 lifts up off of piston head 206, stopping on the shoulder of rebound spacer plug 242. This allows the slots 240 of piston head 206 to be fully exposed and the flow rate of the STF 230 to be maximal. This reverse movement is partially due to force from the spring 208 pushing against the cam follower 254 to orient itself with the hinge cam 210, as it returns to a lower (door open) position to prepare the cam follower 254 for door closing. This also ensures the assembly 202 is positioned a maximal distance from the cap 212. Rebound spacer plug 242 also serves a secondary purpose of retaining shim 204 on shoulder bolt 234 so that it does not separate from the piston assembly 202 upon retraction (e.g., as the door is opened).

The cap adjuster 214 performs the dual purpose of capping the top of the fluid chamber 232 and acts as an adjustment knob for the user to control the flow rate of the STF 230 through the slots 238 and 240. The D-shaped rod 211 in the adjustable cap 214 extends into chamber 232 and into a D-shaped slot 235 in the shoulder bolt 234. Adjustable cap 214 causes the shoulder bolt 234 (and shim 204, which is connected to the shoulder bolt 234) to rotate with respect to the piston head 206. The adjustable cap 214 has an O-ring 248 sealing the lower chamber 232 and an internal retaining ring 250 (as shown in FIG. 12). Internal retaining rings 250 are used to snap-fit parts together so they cannot be taken apart by the user. These rings are permanent internal snap rings that fit mating grooves on the chamber housing 226.

The Hinge System

Turning to FIGS. 32 to 72, a hinge system 300 (also referred to as the "SlamBlok Hinge") that controls the motion of one or more devices, such as the slamming of a door, is shown.

Figure 32:
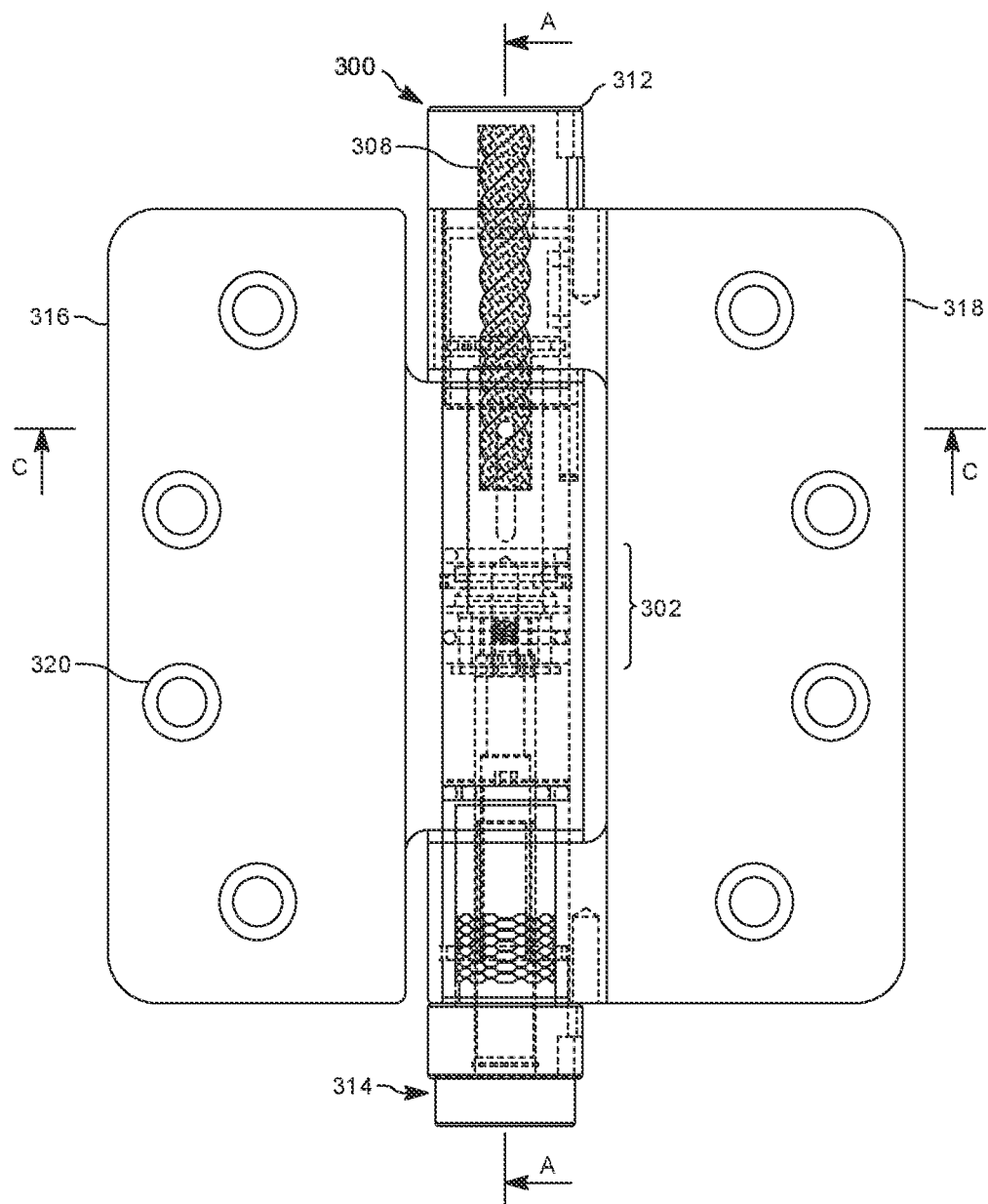
FIG. 32 is a side view of an example hinge system incorporated in a hinge according to an embodiment of the present technology.

The hinge system 300 is configured to replace one or more hinges of a door. As shown in FIG. 32, a complete hinge assembly (with the system 300 incorporated through hinge leaves 316 and 318) performs a similar function as the pin assembly 200 described above by controlling the closure speed of a door and/or stopping fast or forceful movements with a combination of STF resistance combined with the mechanicals disclosed herein. The user can replace one or more of their existing door hinges to have the control they desire.

The disclosed hinge system 300 can be provided in right hand and left-hand versions and can be a complete assembly for the user to install. In other words, no assembly is required by the user, just installation. For example, a first leaf 318 (e.g., a right hand hinge jamb) is attached to the jamb of the door opening and a second leaf 316 (e.g., a right hand opening hinge door) is attached to the door. The leaves 316 and 318 include holes 320 for receiving fasteners that connect the leaves 316 and 318 to the door or jamb.

Figure 34:
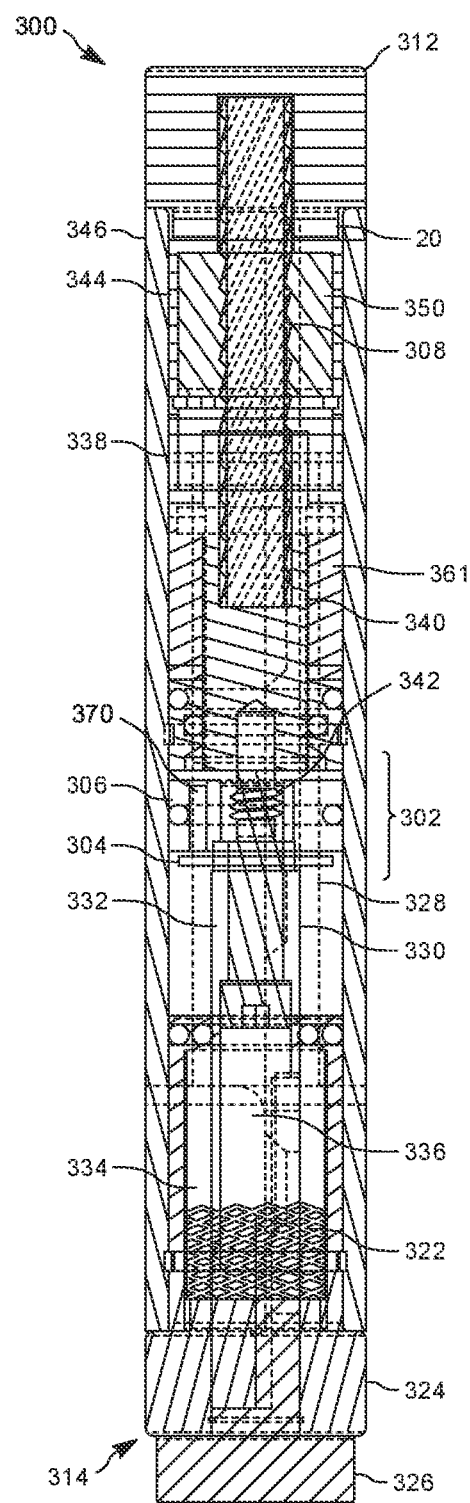
FIG. 34 provides a cross-sectional view of the inner mechanics of an example hinge assembly according to an embodiment of the present technology.
Figure 35:
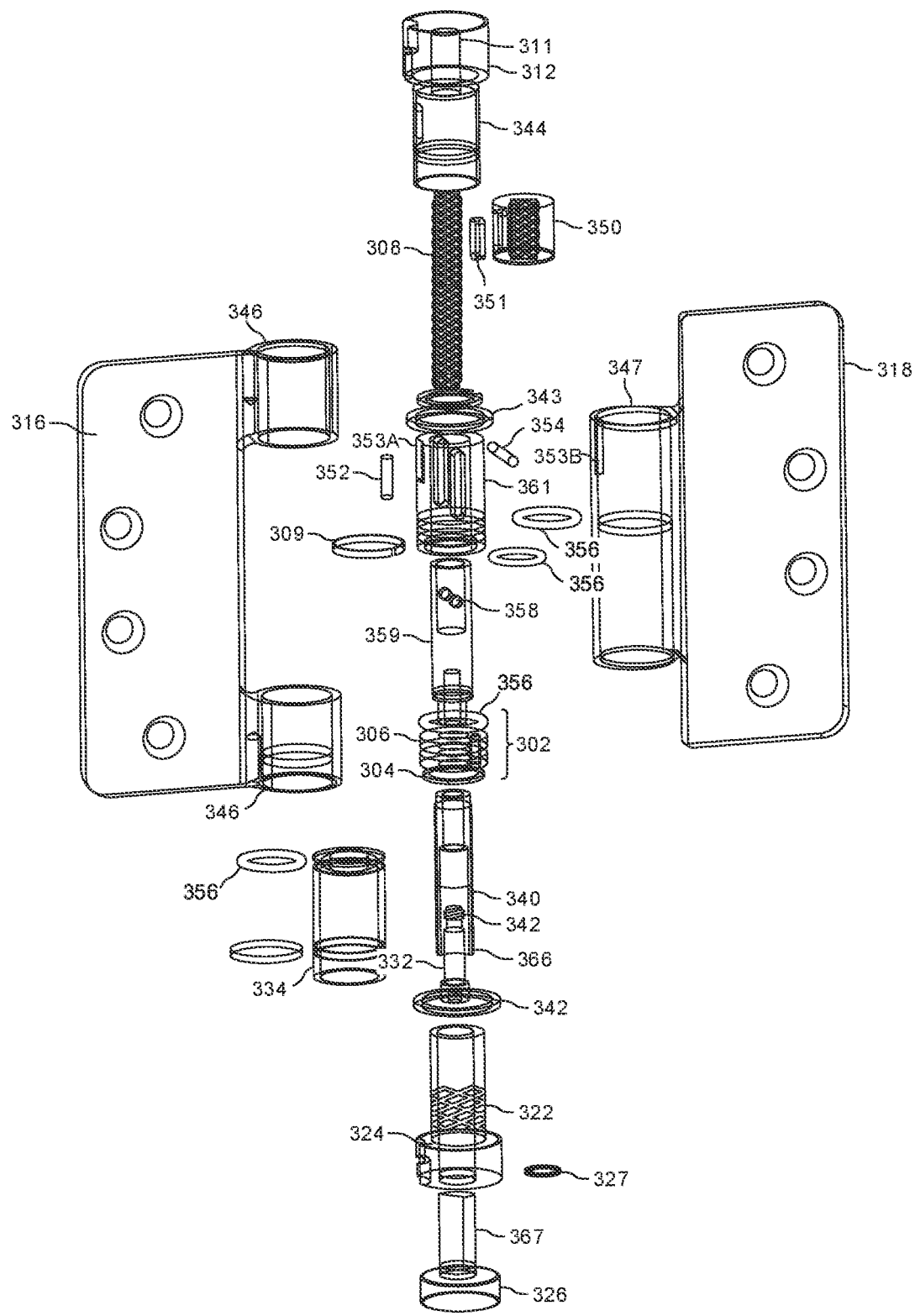
FIG. 35 provides an exploded view of an example hinge assembly and hinge according to an embodiment of the present technology.

With reference to FIGS. 34 and 35, the hinge system 300 turns the rotary motion of the hinge into linear motion using a lead screw mechanism 308 combined with a mating lead screw nut 350 (e.g., an Igus nut right hand nut) to drive a plunger rod 359 which drives a piston assembly 302 (including a piston head 306 and/or a rebound shim 304) though the STF 330 as the door is closed. The mating nut 350 is held stationary within a housing 344 by a key 351 (e.g., a key sized ⅛"). A plunger bushing 361 serves the dual purpose of maintaining the concentric position of the plunger rod 359 and sealing an STF chamber 328 area within a chamber housing 334 (or bushing pin) inserted in first leaf 318. The seal of the plunger bushing 361 on the plunger rod 359 and the in the STF chamber area 328 of chamber housing 334 is accomplished by O-rings 356, and plunger bushing 361 is retained in place by a retaining ring 309.

The lead screw mechanism 308 is keyed to the plunger bushing 361 with a dowel pin 354 which keeps plunger bushing 361 and lead screw mechanism 308 in the same rotational position in relation to each other while allowing the lead screw mechanism 308 to travel vertically with the rotation of the hinge.

The mating lead screw nut 350 never moves up or down. The lead screw mechanism 308 moves up and down which is one of the reasons for the internal space in the pin hinge shaft 311 of cap 312 allowing lead screw mechanism 308 space to rise as the door is opened. The housing 344 is pressed into knuckle 346 of hinge leaf 316. The plunger bushing 361, the lead screw mechanism 308, and the plunger rod 359 are held in the same rotational position relative to each other with the dowel pin 354. The dowel pin 354 effectively drives the plunger rod 359 since it is connected to both the lead screw mechanism 308 and the plunger rod 359. Ring 20 snapably retains the mating lead screw nut 350 into the pin hinge shaft 311 of cap 312, as shown in FIG. 34.

A pin 352 connects (or "keys") the bushing 361 to the hinge leaf 318 such that, as the hinge leaf 318 rotates, the plunger bushing 361 rotates with the hinge leaf 318. In other words, both bushing 361 and hinge leaf 318 rotate with respect to hinge leaf 316. The keyway on the two hinge leafs (316, 318) line up so that the subassembly (which includes the plunger bushing 361 and pin 352 extending out of the plunger bushing 361) can be inserted as a whole cartridge during assembly, i.e., the bushing 361 and pin 352 can be slid through the top knuckle 346 of hinge leaf 316 into the knuckle 347 of hinge leaf 318 such that the pin 352 partially rests in portion 353A and 353B, as shown in FIG. 35.

In operation, when the hinge leaf 318 is rotated from open to closed, the plunger bushing 361, which is secured to the hinge leaf 318 by pin 352, rotates with the hinge leaf 318. As the plunger bushing 361 rotates, it causes the lead screw mechanism 308, which is connected to the plunger bushing 361 by the pin 354, to start rotating downward away from mating lead screw nut 350 and pin hinge shaft 311. As the lead screw mechanism 308 rotates downward, the pin 354 slides downward in the slot in the plunger bushing 361. As the position of bushing 361 is fixed relative to knuckle 347 of hinge 318, the relative rotational movement between hinge leaves 316 and 318 forces linear movement of lead screw mechanism 308. For example, the rotational movement between hinge leaves 316 and 318 forces the lead screw mechanism 308 to rotate within mating lead screw nut 350, thereby causing the linear motion of the lead screw mechanism 308 and the connected plunger assembly 302, as disclosed herein.

Because the plunger rod 359 is connected to the lead screw mechanism 308 by the pin 354, the plunger rod 359 moves downward with the lead screw mechanism 308, which causes the shim 304 and piston head assembly 302 to push into the STF 330 in the chamber 328 of chamber housing 334. The STF 330 reacts to the engagement from the shim 304 and piston head assembly 302 as previously described depending on how the slots on the shim 304 are aligned with the slots on the piston head assembly 302. In this way, the STF 330 controls the rotary motion of the hinge leaf 318 when the hinge leaf 318 is closed. Upon opening the door, hinge leaf 318 is rotated away from hinge leaf 316 and the lead screw mechanism 308 screws back up toward the mating lead screw nut 350 and pin hinge shaft 311. As the lead screw mechanism 308 screws upward, the plunger rod 359, which is connected to the lead screw mechanism 308, moves upward as well.

Figure 36:
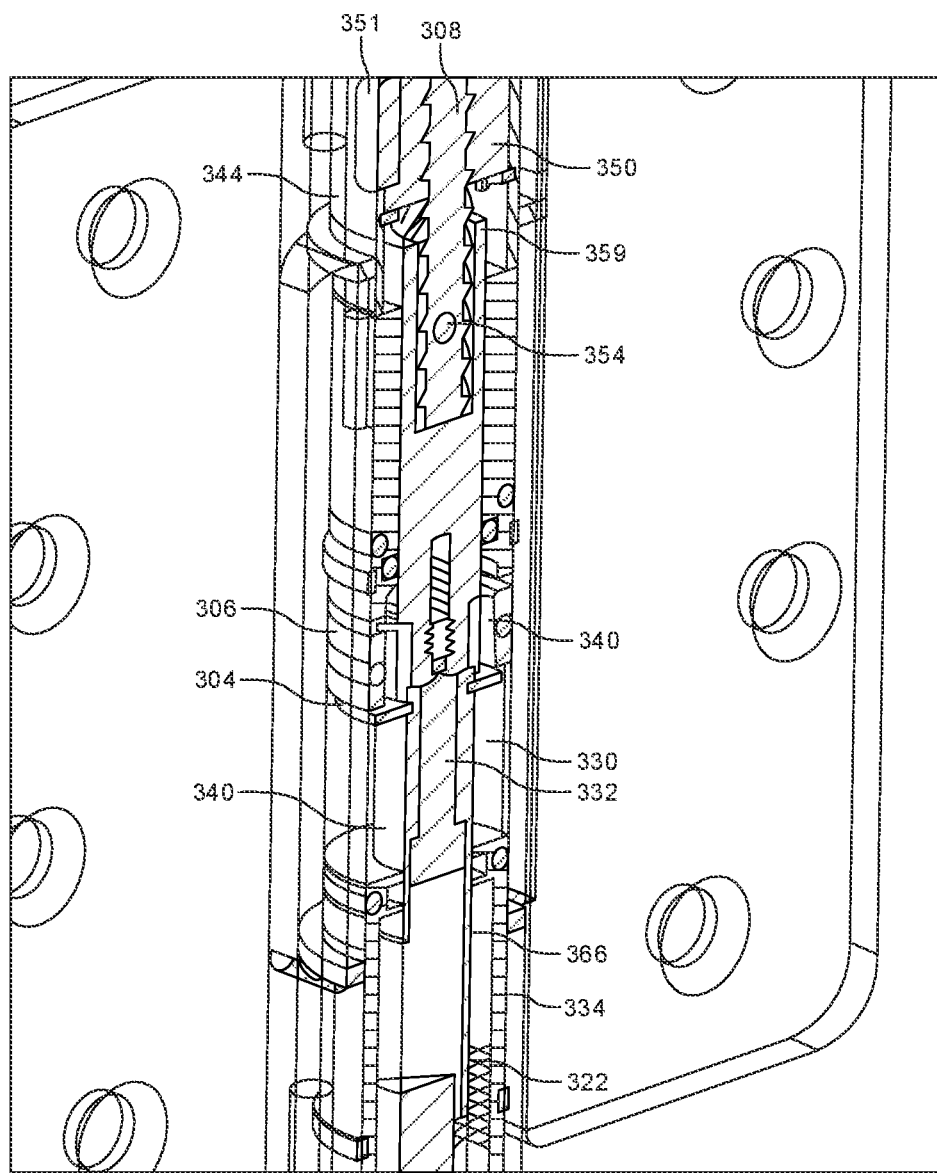
FIG. 36 provides a cross-sectional view of the inner mechanics of an example hinge assembly according to an embodiment of the present technology.

With references to FIGS. 34-36, a shoulder bolt 332 is configured for insertion to the rebound spacer plug 340. The shoulder bolt 332 screws into the plunger rod 359, thereby securing the piston head 306 to the plunger rod 359. Shim 304 is arranged at an end of the rebound spacer plug 340 such that rotation of the rebound spacer plug 340 can adjust alignment of the shim 304 relative to the piston head 306. The rebound spacer plug 340 is long enough to provide sufficient distance between the shim 304 and the piston head 306, such that the rebound shim 304 is allowed to move up and down relative to the piston head 306 during opening or closing of the door, as shown in the cross-sectional view of FIGS. 36 and 54.

The hinge system 300 includes a knob 314 on a hinge pin shaft bottom 324 of the hinge assembly 300 that can be used to control the flow rate of the STF 330 (such as that described above with respect to the linear motion control device) through the piston slots 372 (FIG. 56) through the use of a rebound shim 304. The operation is similar to that described above for the linear motion control device. In particular, the fluid flow is controlled by rotating a knob adjuster 326 which passes through the hinge pin shaft bottom 324, which is knurled and pressed into the lower portion of hinge leaf 316. The knob adjuster 326 includes a D- or C-shaped extension 367 that is mated to and allows the sliding of the rebound spacer plug 340 along a D- or C-shaped extension 366 up and down the extension 367 of the knob adjuster 326, as shown in detail, for example, in FIGS. 44 and 70. The D-shaped mating of these two parts allows the rotation of the knob adjuster 326 to turn the rebound shim 304, thus controlling STF flow while the mating D-shape also allows those two parts to bypass each other as the piston head 306 moves up and down (FIG. 70). The retaining ring 327 retains the knob adjuster 326 into the hinge pin shaft bottom 324 while still allowing it to rotate. Thrust washers 343 act as spacers that allow the two hinge leaves to rotate while mating with each other.

Figure 37:
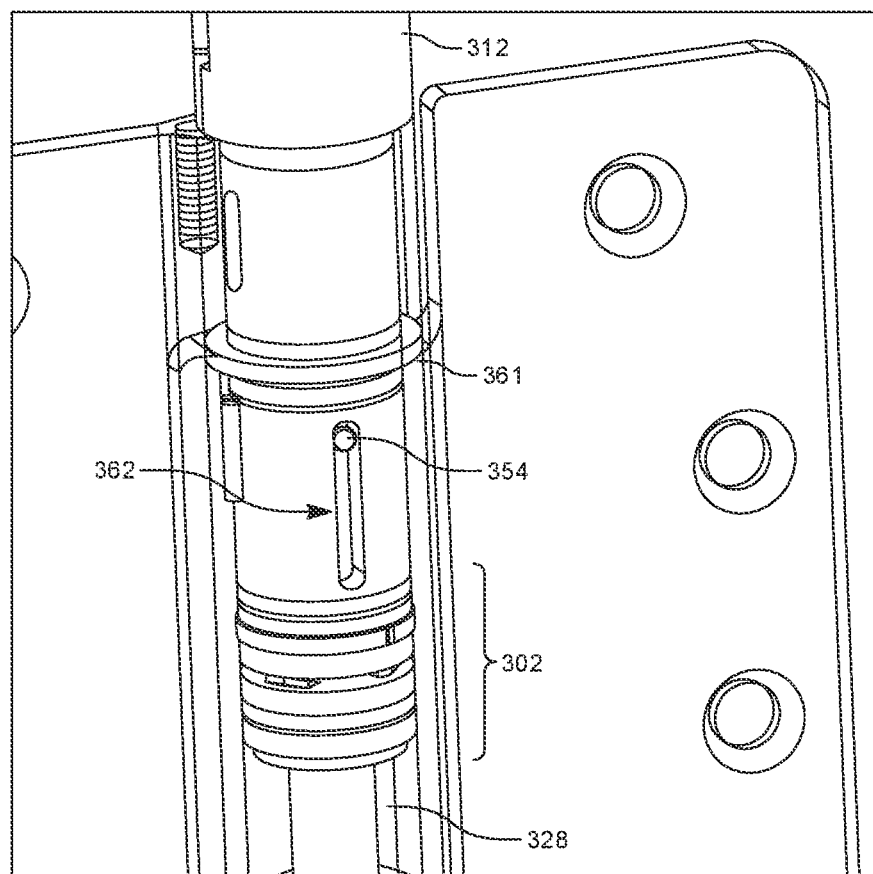
FIG. 37 illustrates a view of an example plunger bushing according to an embodiment of the present technology.

FIG. 37 illustrates a view of the plunger bushing 361, including a slot 362 oriented with the linear motion of the lead screw mechanism 308. In particular, the pin 354 extends into the slot 362 and limits the linear movement (both towards and away from the cap 312). This in turn limits the linear movement of the piston assembly 302 within the chamber 328. As shown in FIG. 37, pin 354 is within slot 362 closer to cap 312, indicating that opening of the door has moved the screw 308 into the cap 312. FIG. 37 shows pin 354 within the slot 362 farthest from cap 312, indicating that closure of the door has moved the lead screw mechanism 308 away from the cap 312.

Figure 38:
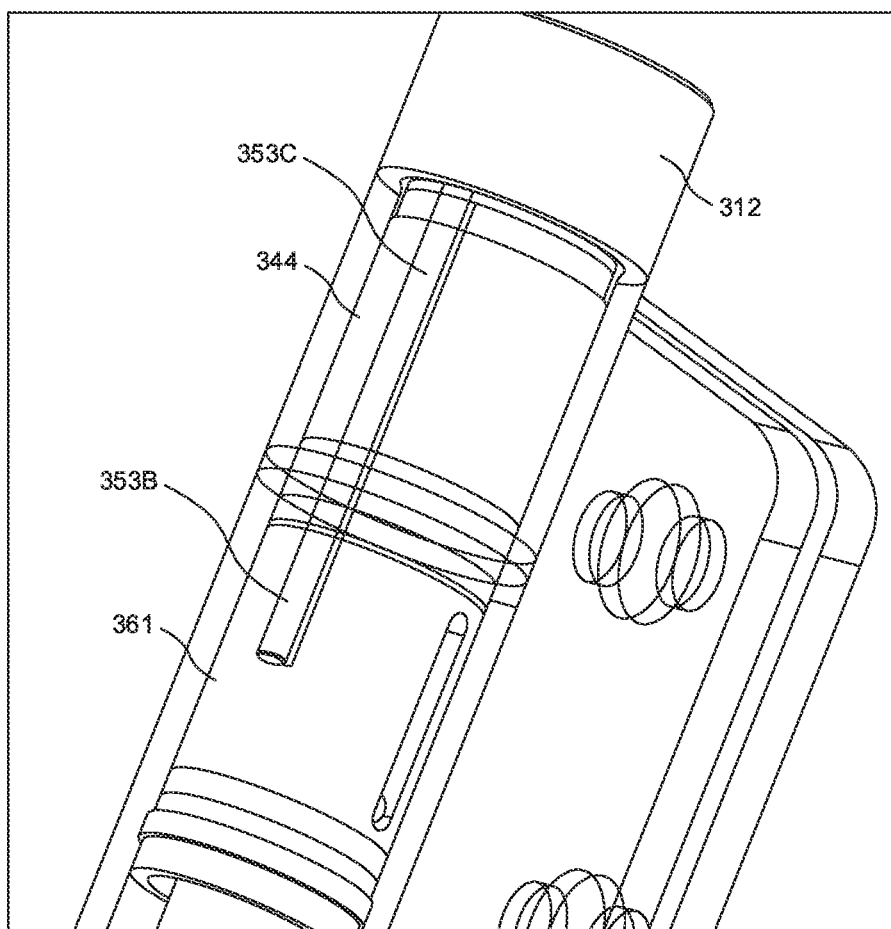
FIG. 38 illustrates a view of an example pin of an example hinge assembly according to an embodiment of the present technology.
Figure 39:
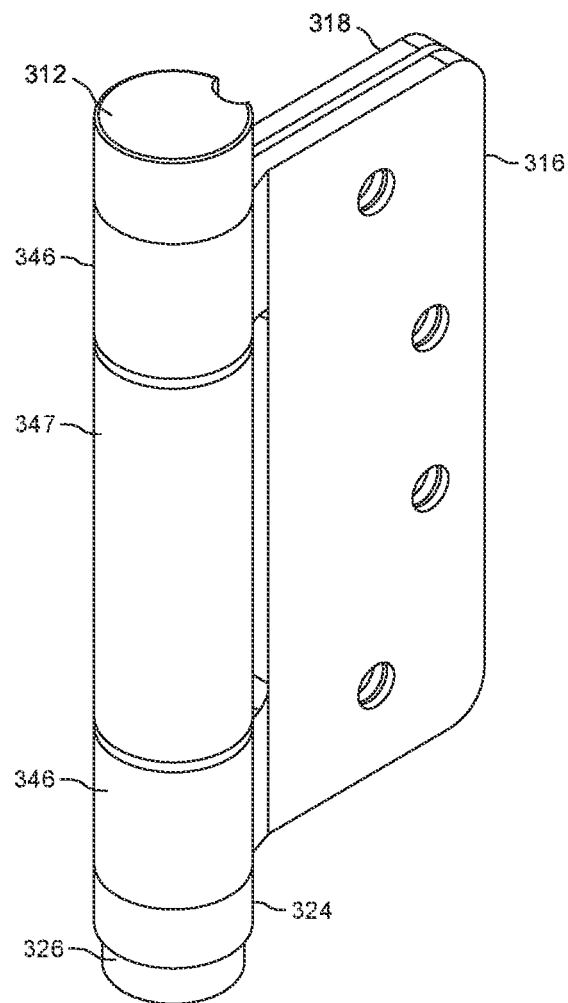
FIGS. 39 and 40 illustrates a perspective view of an example closed hinge according to an embodiment of the present technology.
Figure 40:
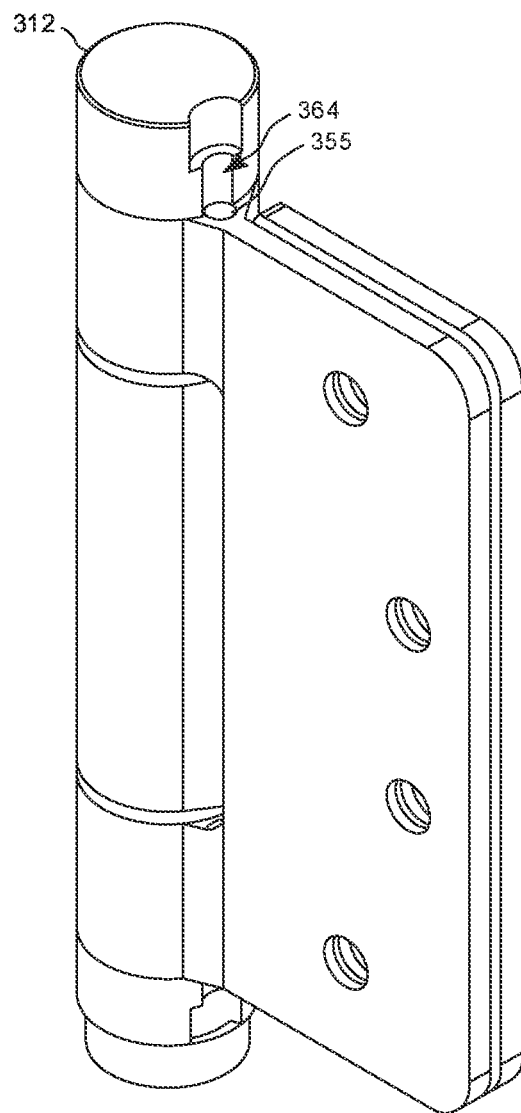

FIGS. 38-40 illustrate a perspective view of the closed hinge. In the example of FIG. 38, a channel 353C allows pin 352 to access portion 353B on bushing 361 by being inserted from a top of the hinge. As shown in FIG. 39, the cap 312 includes with an indentation 364 to accept pin 352 to force movement of the spring 308 in response to rotation of the hinge leaves. For example, the pin 352 fixes the orientation of the bushing 361 relative to knuckle 347 of hinge leaf 318 such that rotation of the hinge leaf 318 relative to hinge leaf 316 causes the bushing 361 to rotate. Rotation of the bushing 361 forces rotation of pin 354 and the screw 308 relative to the nut 350, causing the screw 308 to move up or down relative to the cap 312. Movement of the screw 308 drives the assembly 302 into or out from the chamber 328, such that the assembly 302 interacts with STF 330 to slow movement of the hinge.

Figure 42:
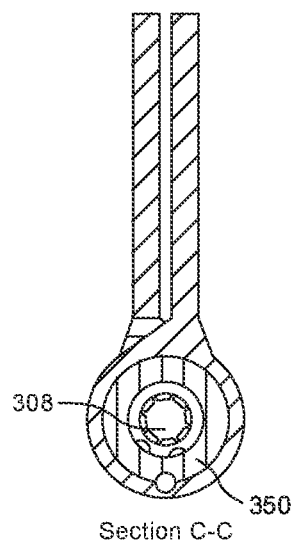
FIG. 42 is a top view of an example hinge system and hinge according to an embodiment of the present technology.
Figure 41:
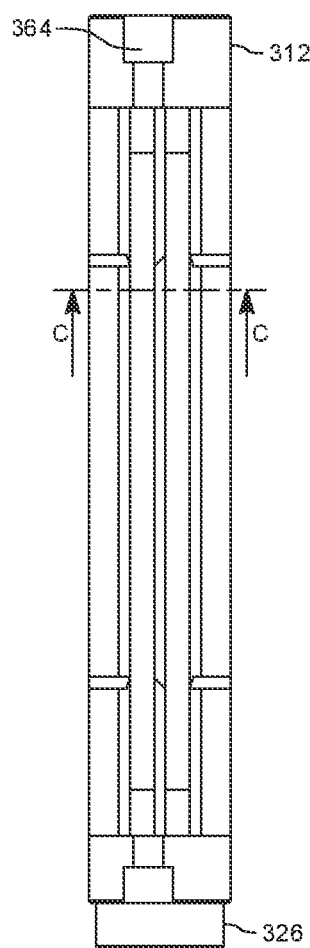
FIG. 41 illustrates a front view of an example hinge assembly and hinge according to an embodiment of the present technology.

FIG. 41 illustrates a front view of the hinge and hinge assembly, with FIG. 42 showing a cross-section of the hinge and hinge assembly.

Figure 43:
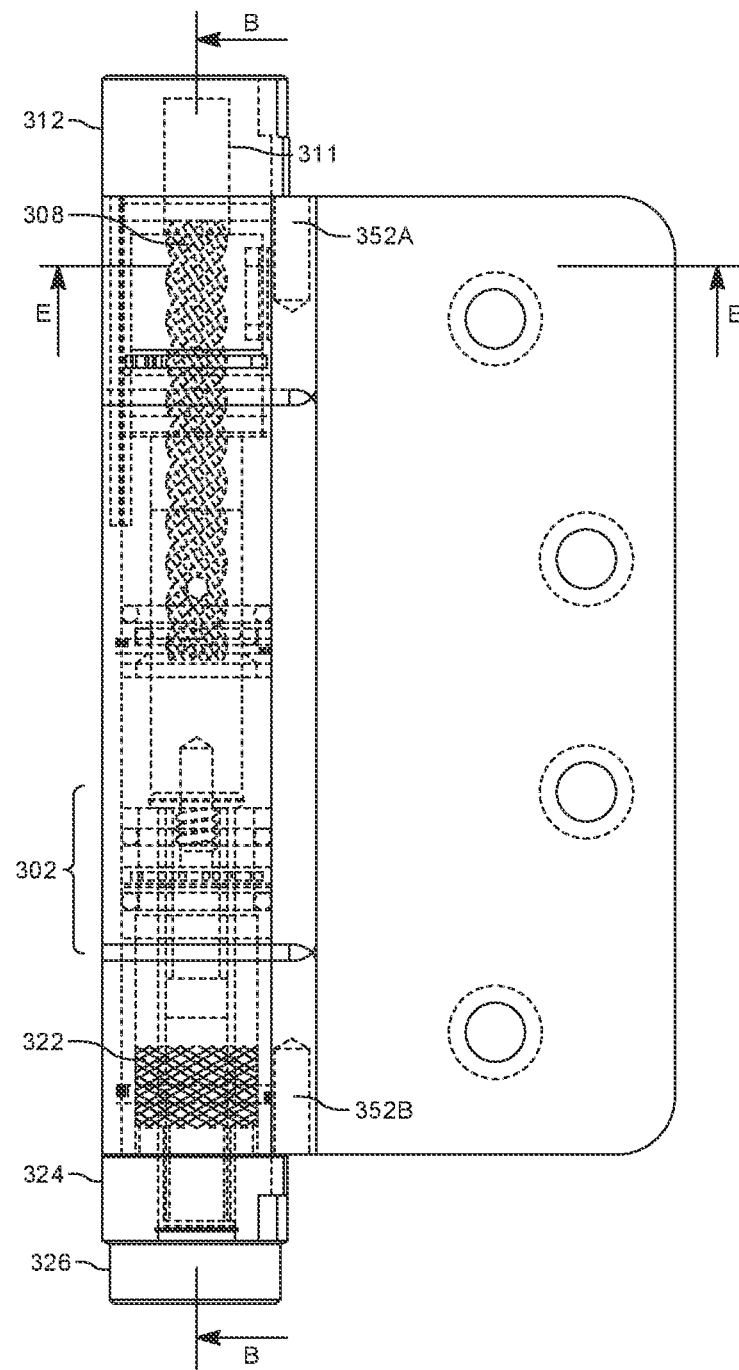
FIG. 43 illustrates an example hinge assembly with mechanicals revealed according to an embodiment of the present technology.

FIG. 43 illustrates the assembly 300 in the hinge, with mechanicals revealed. As shown, a pin slot 352A is arranged at a first end of hinge leaf 316 to accept a pin 355 to fix the orientation of the housing 344 and/or the cap 312 relative to the hinge. Pin slot 352B is arranged at a second end of leaf 318 to accept a pin to fix the orientation of 324 relative to the hinge.

Figure 44:
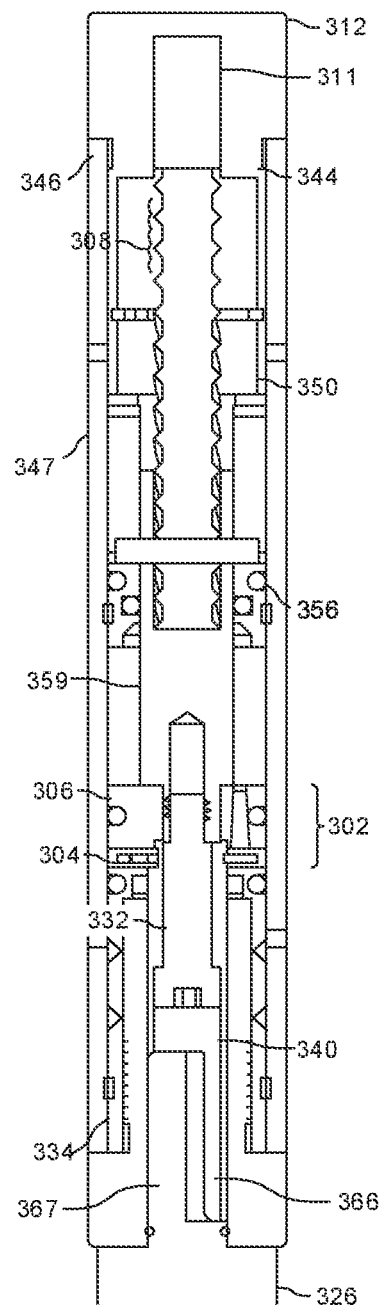
FIG. 44 illustrates a cross-sectional view of an example hinge assembly with the mechanicals being partially revealed according to an embodiment of the present technology.

FIG. 44 illustrates a cross-sectional view of the hinge assembly 300 with the mechanicals being partially revealed.

Figure 45:
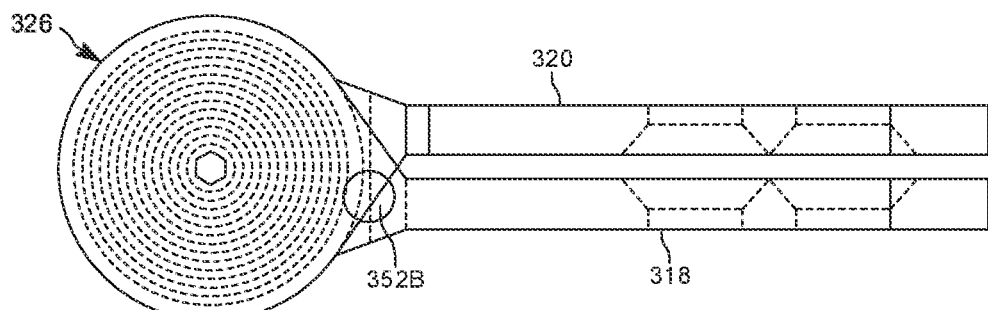
FIG. 45 illustrates a bottom view of an example hinge assembly and hinge according to an embodiment of the present technology.
Figure 46:
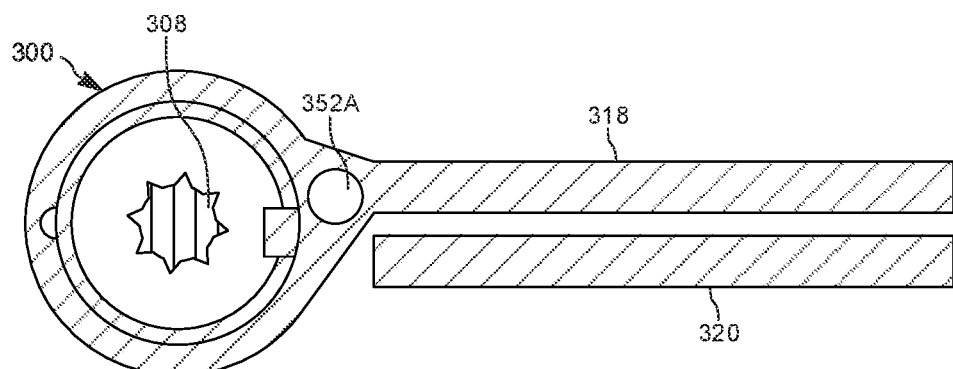
FIG. 46 illustrate cross-sectional view of an example hinge assembly and hinge according to an embodiment of the present technology.
Figure 47:
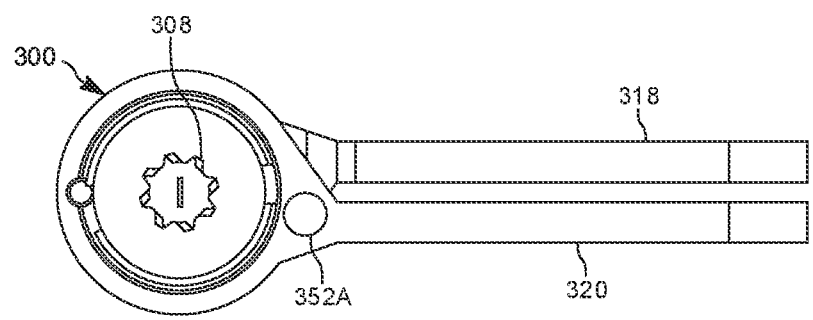
FIG. 47 illustrates a top view of an example hinge assembly and hinge according to an embodiment of the present technology.

FIGS. 45-47 provide cross-sectional views of the hinge assembly 300, of the bottom, center, and top views, respectively.

Figure 48:
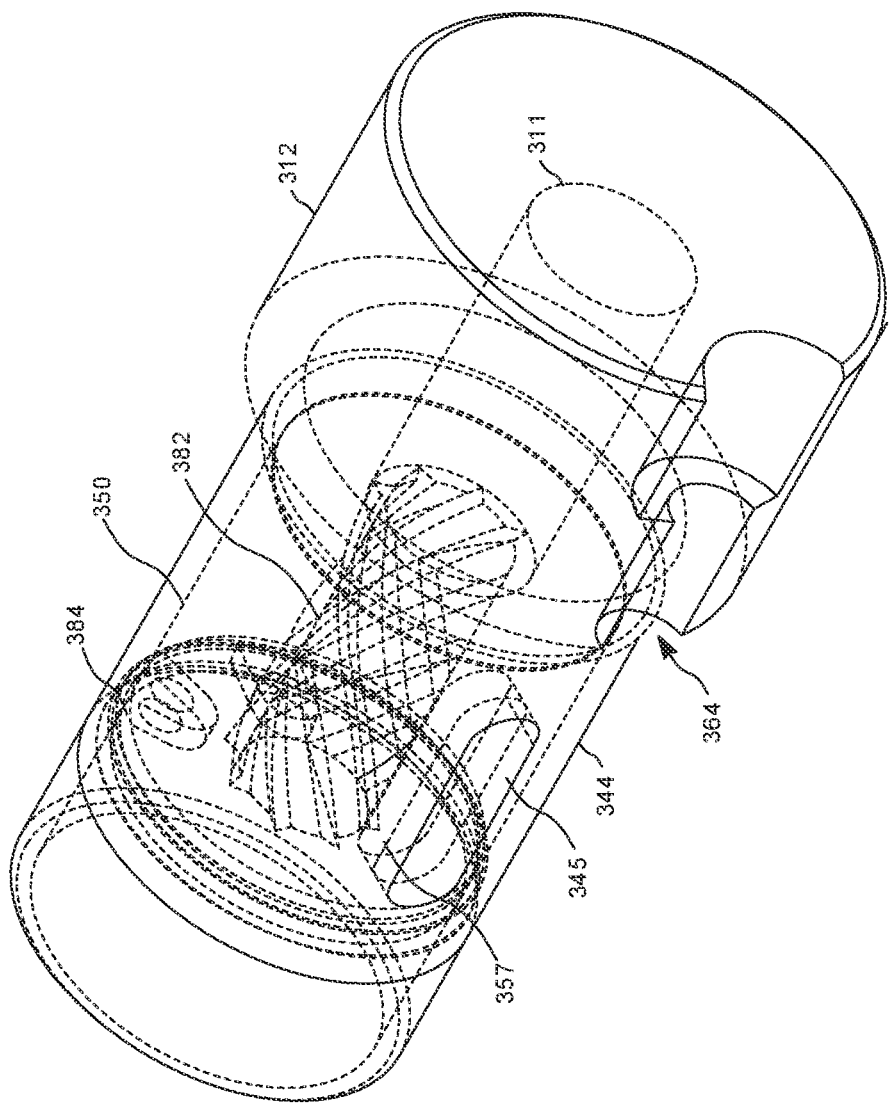
FIGS. 48-51 illustrate multiple views of an example cap and mating lead screw nut according to an embodiment of the present technology.
Figure 50:
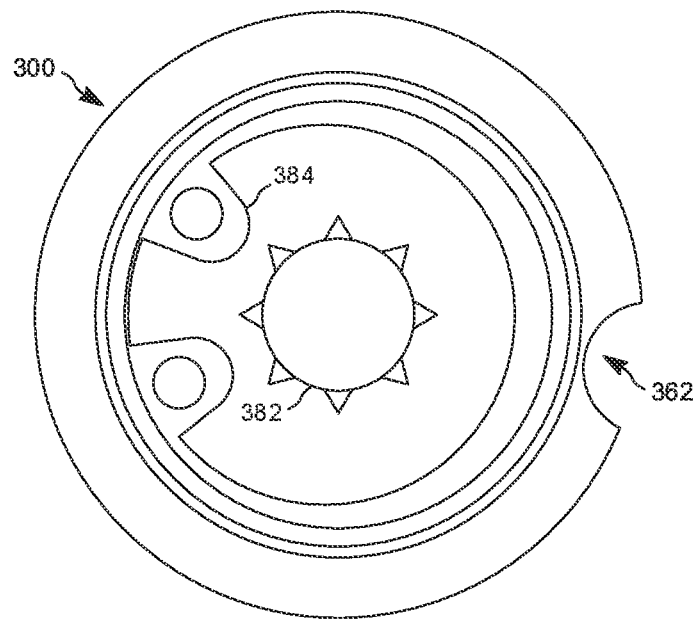
Figure 49:
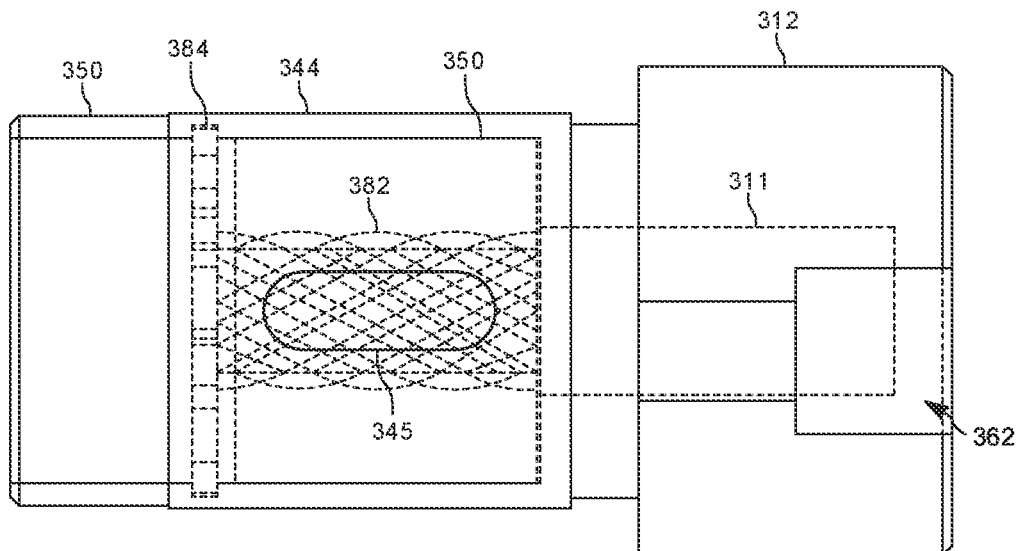
Figure 51:
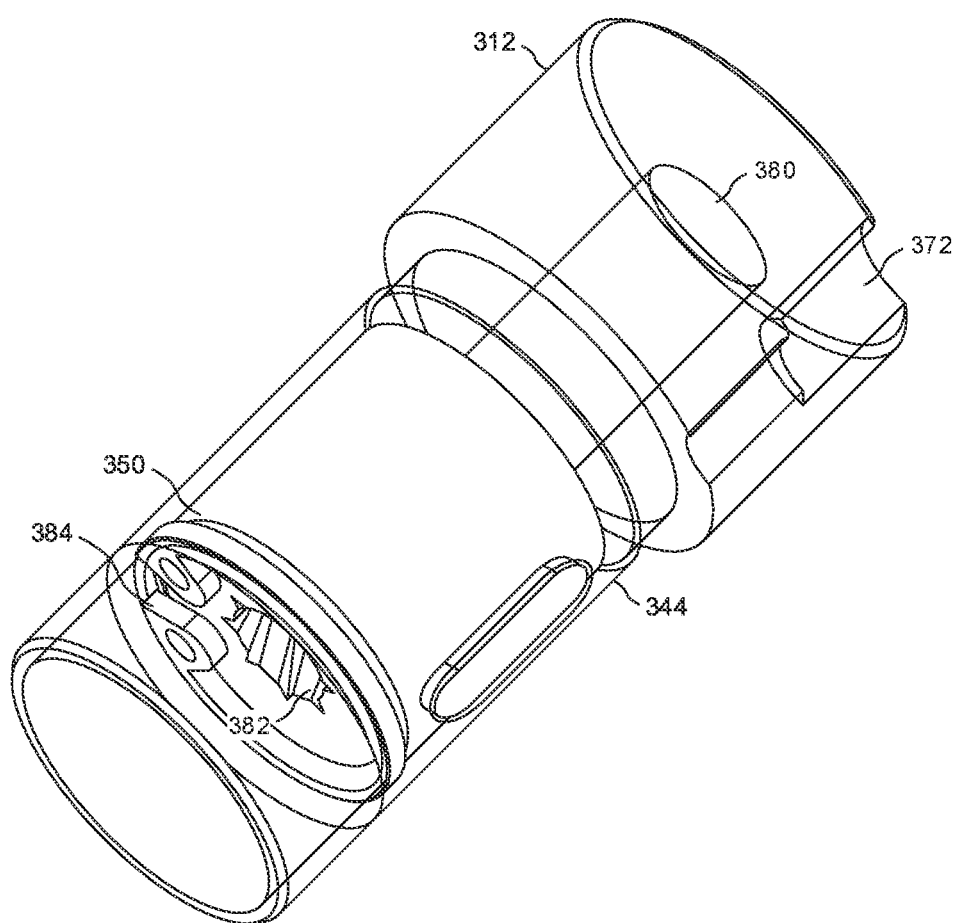
Figure 52:
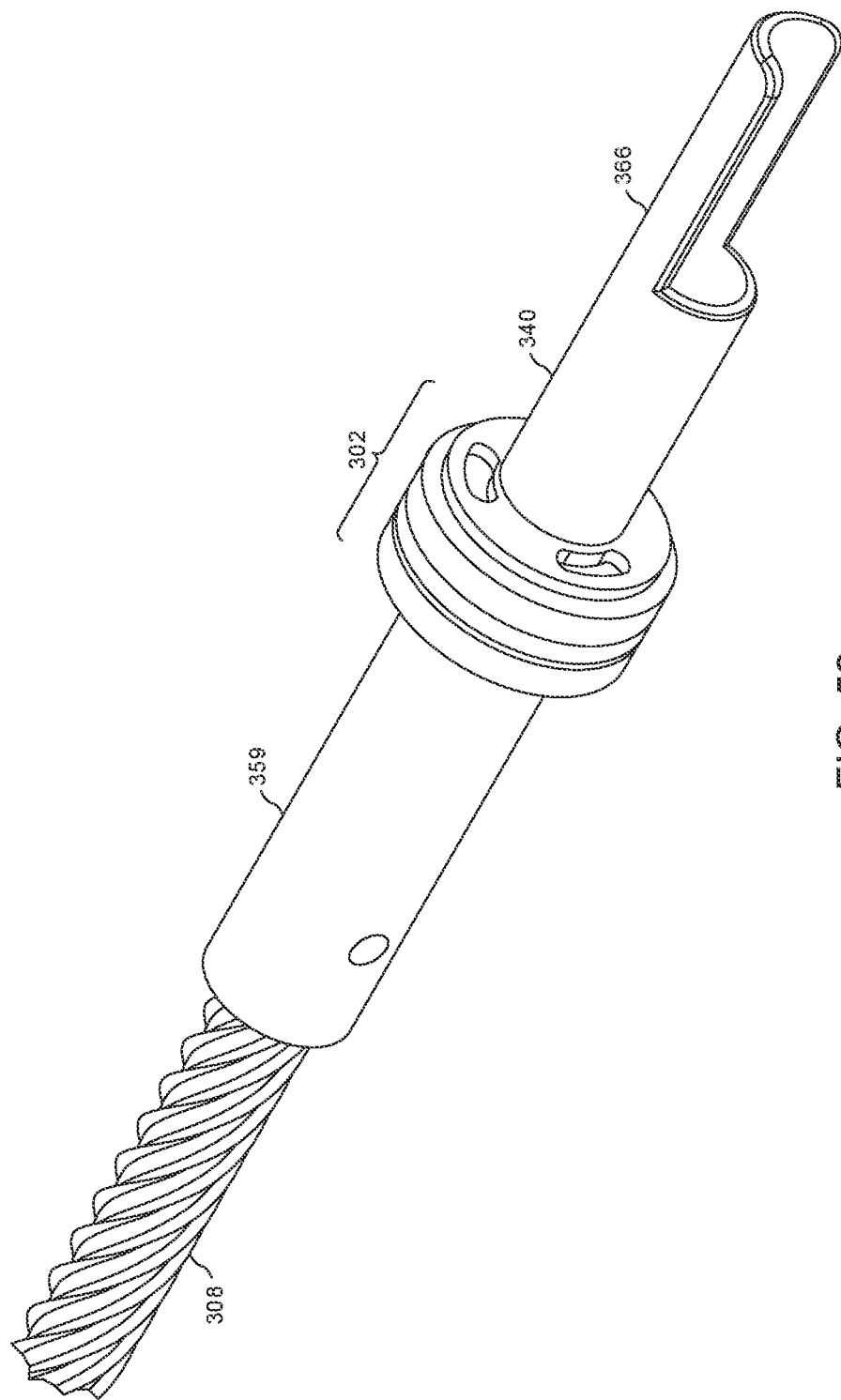
FIGS. 52-54 illustrate multiple views of an example piston assembly and lead screw mechanism according to an embodiment of the present technology.
Figure 53:
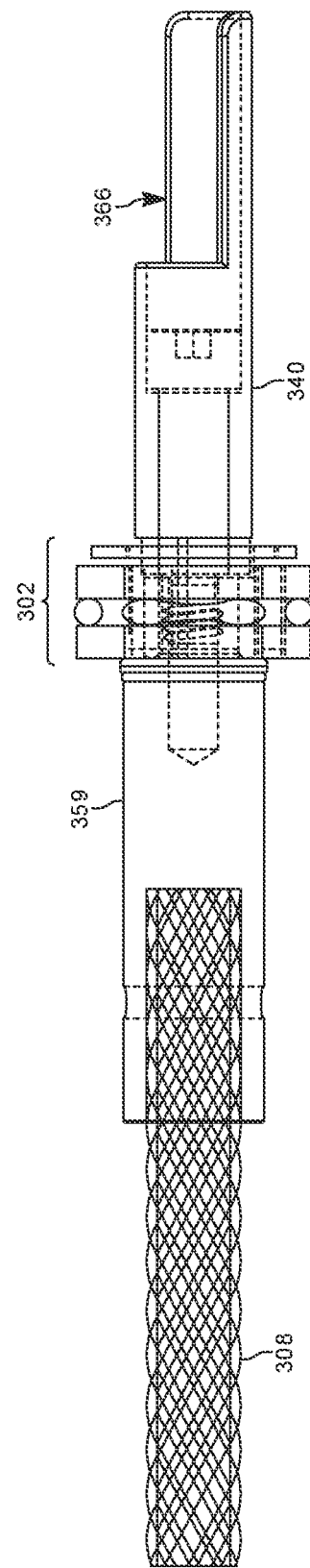
Figure 54:
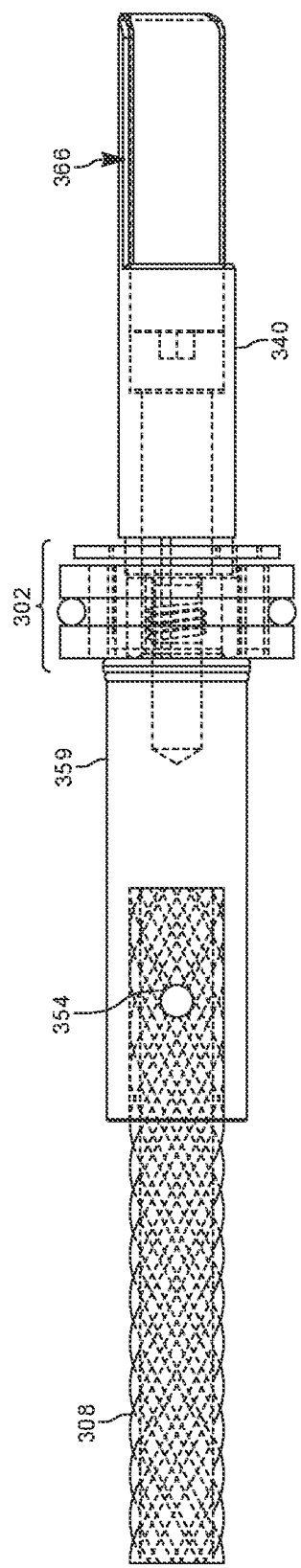

FIGS. 48-51 provide multiple views of the cap 312 and mating lead screw nut 350 held in place by a ring snap internal bore 384. As shown, slot 345 of housing 344 is aligned with slot 357 of mating lead screw nut 350 to receive key 351. As shown in FIG. 48, mating lead screw nut 350 includes a threaded shaft 382, which is configured to accept the lead screw mechanism 308 of FIG. 32.

Figure 55:
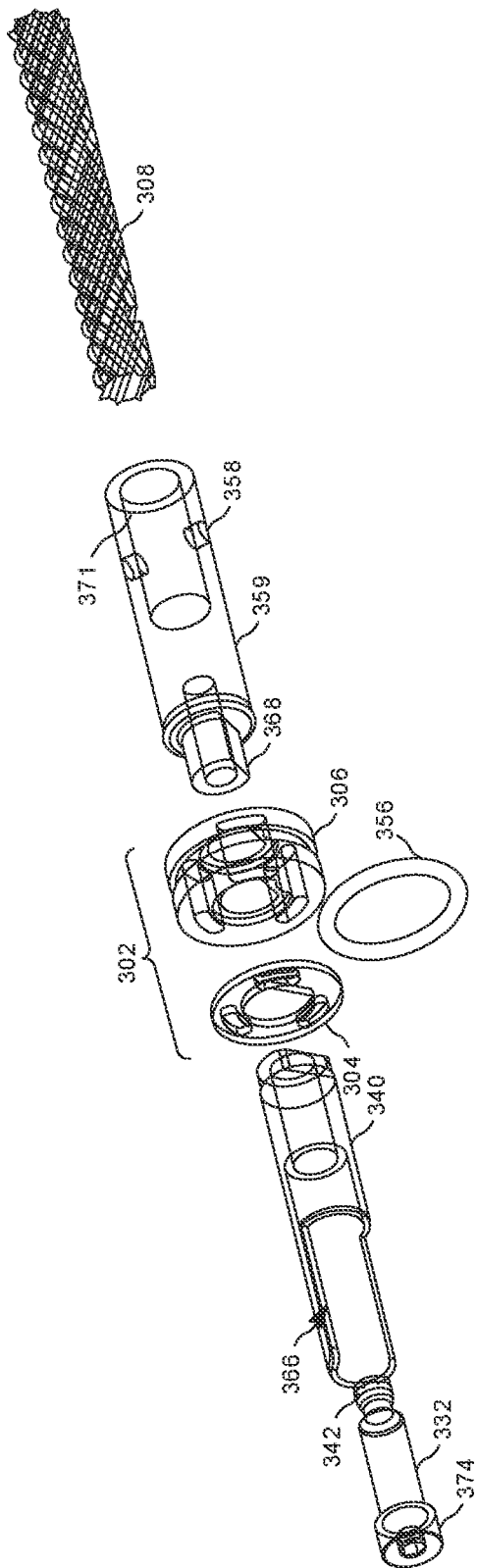
FIGS. 55 and 56 illustrate exploded views of an example piston assembly and lead screw mechanism according to an embodiment of the present technology.
Figure 56:
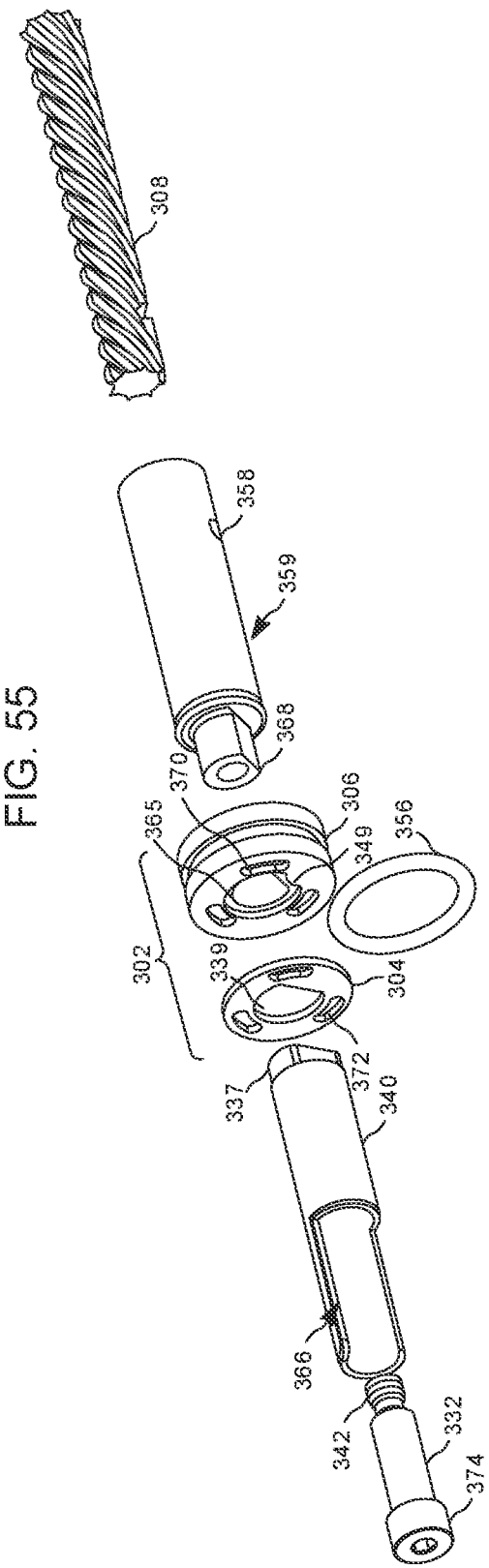
Figure 57:
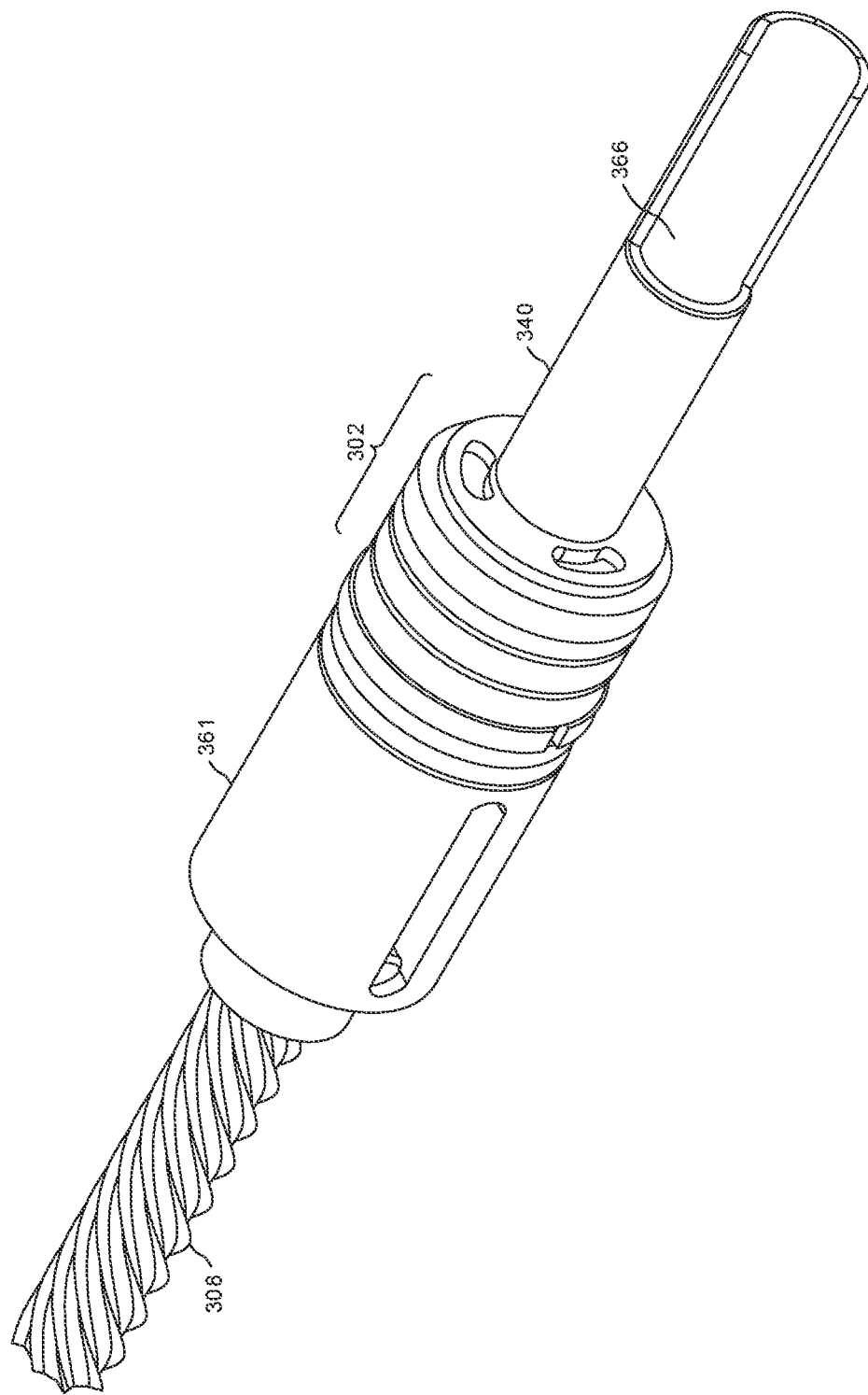
FIGS. 57 and 58 illustrate perspective views of an example piston assembly, lead screw mechanism and plunger bushing according to an embodiment of the present technology.
Figure 58:
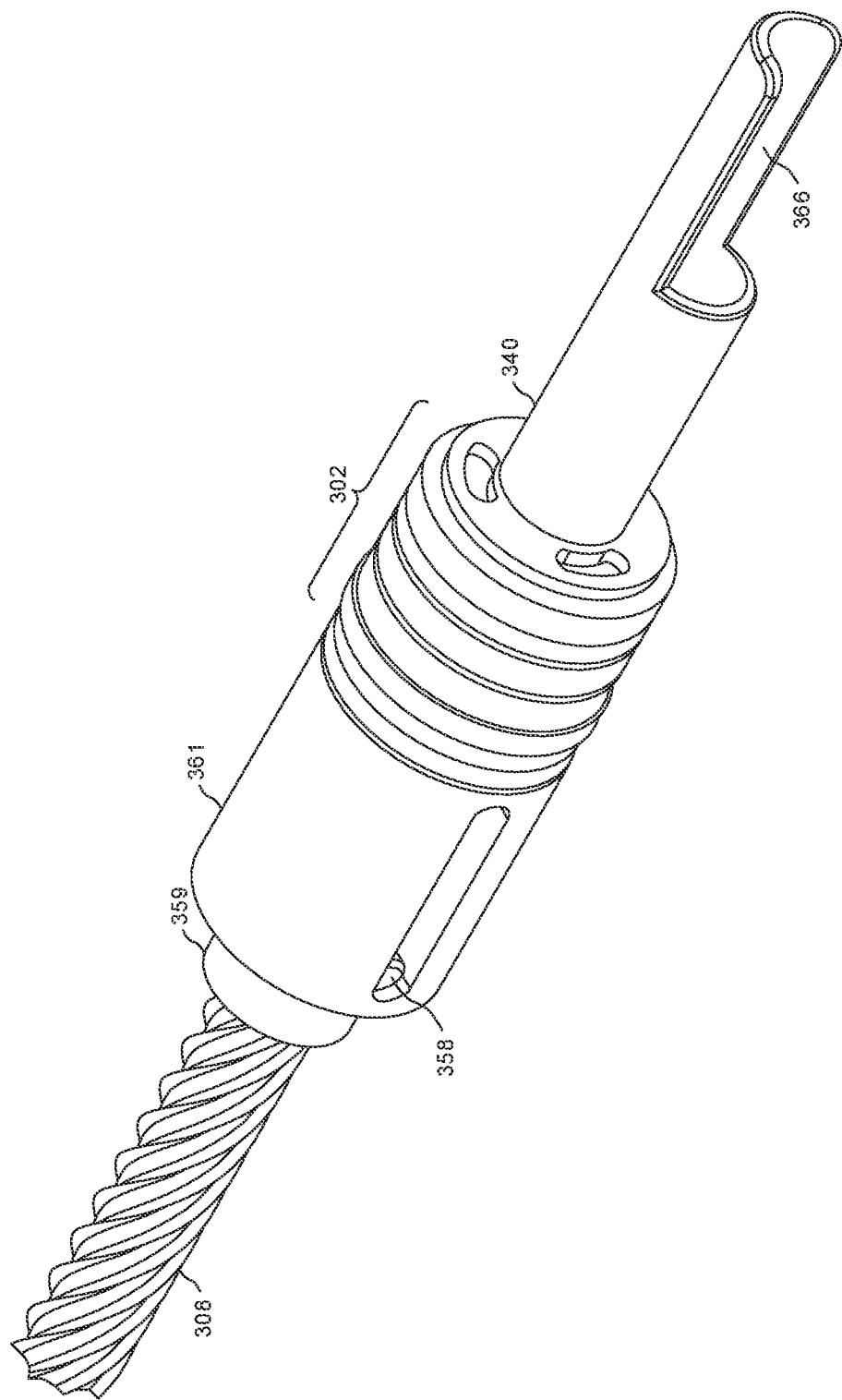
Figure 59:
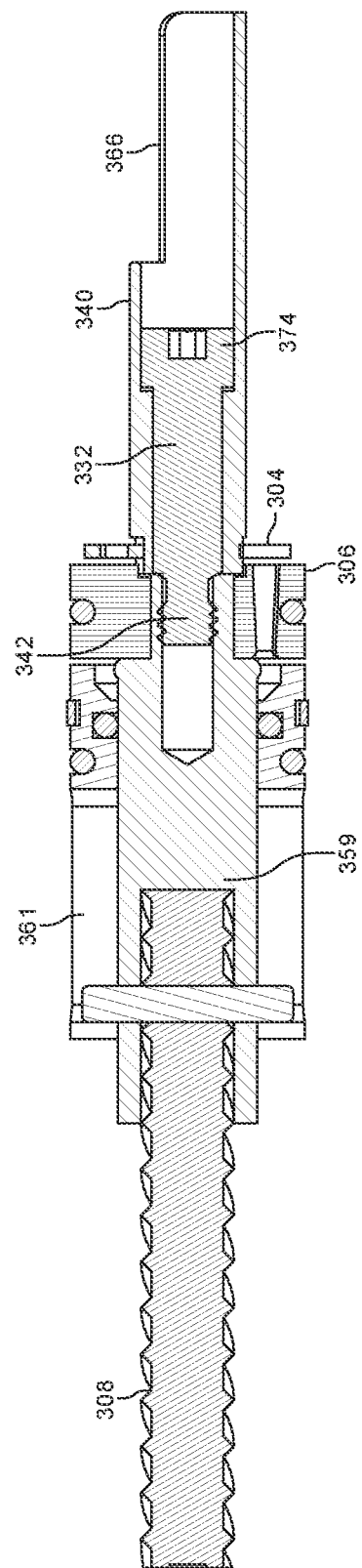
FIGS. 59 and 60 illustrate cross-sectional views of an example piston assembly, lead screw mechanism and plunger bushing according to an embodiment of the present technology.
Figure 60:
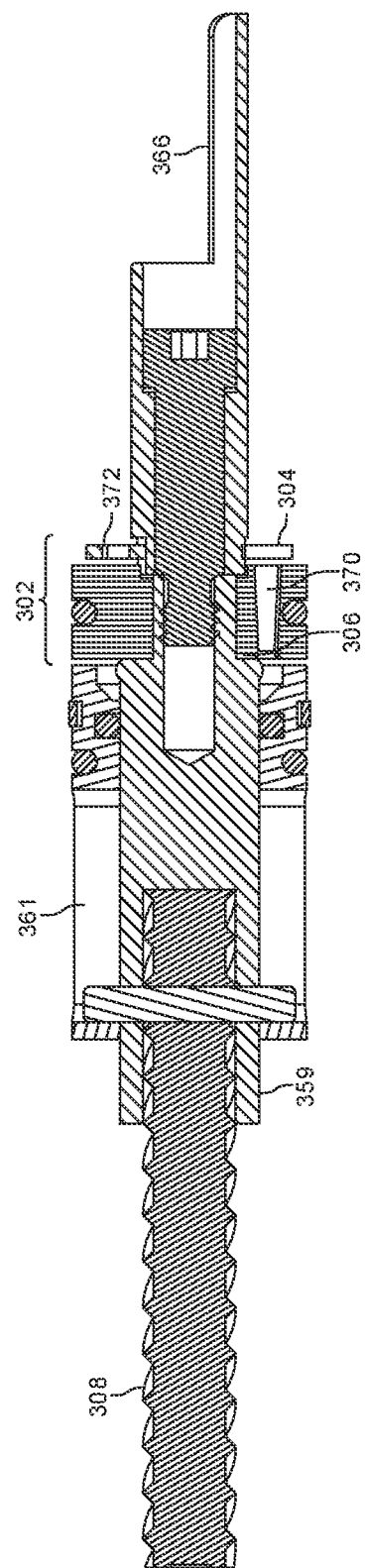
Figure 61:
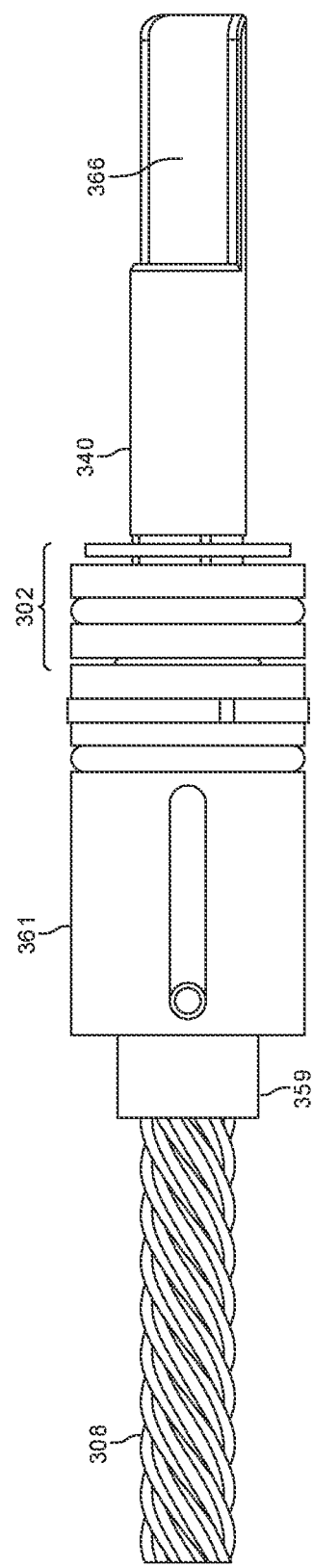
FIGS. 61-64 illustrate multiple views of an example piston assembly, lead screw mechanism and plunger bushing according to an embodiment of the present technology.
Figure 64:
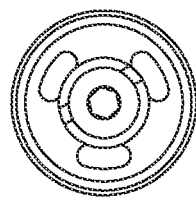
Figure 62:
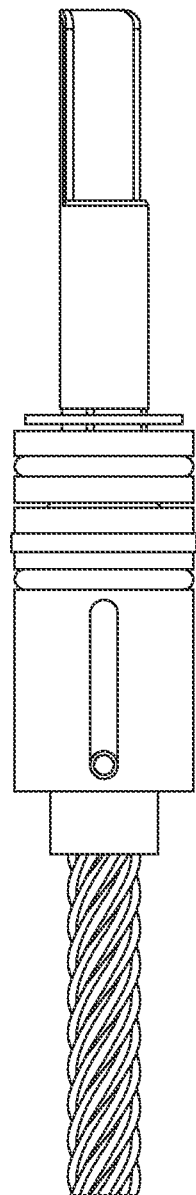
Figure 63:
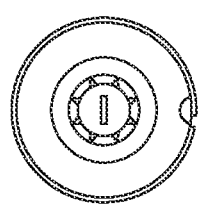

FIGS. 52-58 illustrate multiple views of the piston assembly 302 and lead screw mechanism 308. FIGS. 55 and 56 show exploded views of the piston assembly 302, with the slots 372 in the rebound shim 304 in relation to the slots 370 in piston cam shape D 306. For example, plunger rod 359 includes a shaft 371 to accept the lead screw mechanism 308, with holes 358 to accept a pin or dowel 354 to secure the lead screw mechanism 308. A D-shaped endpoint 368 is configured to fit the piston 306. Rebound spacer plug 340 includes the extension 366 to accept shoulder bolt 332 to secure rebound spacer plug 340 to plunger rod 359. Shoulder bolt 332 includes a fastening end 374 configured to receive a tool to turn the shoulder bolt 332 to screw threaded portion 342 into endpoint 368.

With respect to FIG. 56, the plug 340 includes a generally D-shaped lip portion 337 that is received in the hole 339 of the shim 304. The lip portion 337 of the plug 340 is received in counterbore 365 of the piston head 306. As shown in FIG. 56, the shoulder bolt 332 can includes threads 342 that allows for it to be threadably connected to the endpoint 368 of plunger rod 359. The lip portion 337 of the plug 340 is rotatable with respect to the piston head 306. For example, the lip portion 337 extends into the counterbore 365 and a protrusion 349 of the piston head 306 limits how far the lip portion 337 (and thereby the shim 304) can rotate.

In some examples, the plug, lip portion, shim and piston head can be connected and oriented such that the blocking of further rotation of the lip portion in a first direction by the protrusion can indicate to the user that the slots of the shim and the slots of the piston head are aligned and that the blocking of further rotation of the lip portion in a second, opposite direction by the protrusion can indicate to the user that the slots of the shim and the slots of the piston head are not aligned. In some examples, the system includes an indicator (e.g. a visual, audible, tactile, etc.) that provides information regarding alignment of the slots of the shim and the slots of the piston head. For instance, one or more markers (e.g. lines, letters, numbers, graphics, colors, etc.) may be provided on the knob and/or a portion of the system to indicate an amount of resistance and/or alignment of the slots.

In some examples, the shim 304 may float on the lip portion 337 of the plug 340, such that the shim 304 is not in a fixed position with respect to the piston head 306. Thus, the shim 304 can press against the piston head 306 when the shear thickening fluid 330 is being compressed, and pull away from the piston head 306 when the assembly 302 rebounds back to its closed position. Alternatively, the shim 304 may be held in a fixed position with respect to the piston head 306 and/or in contact with the piston head 306, but still be rotatable with respect to the piston head 306 via turning of the adjustable knob 326.

FIGS. 59-64 illustrate multiple views of the piston assembly 302 and lead screw mechanism 308 and plunger bushing 361.

Figure 65:
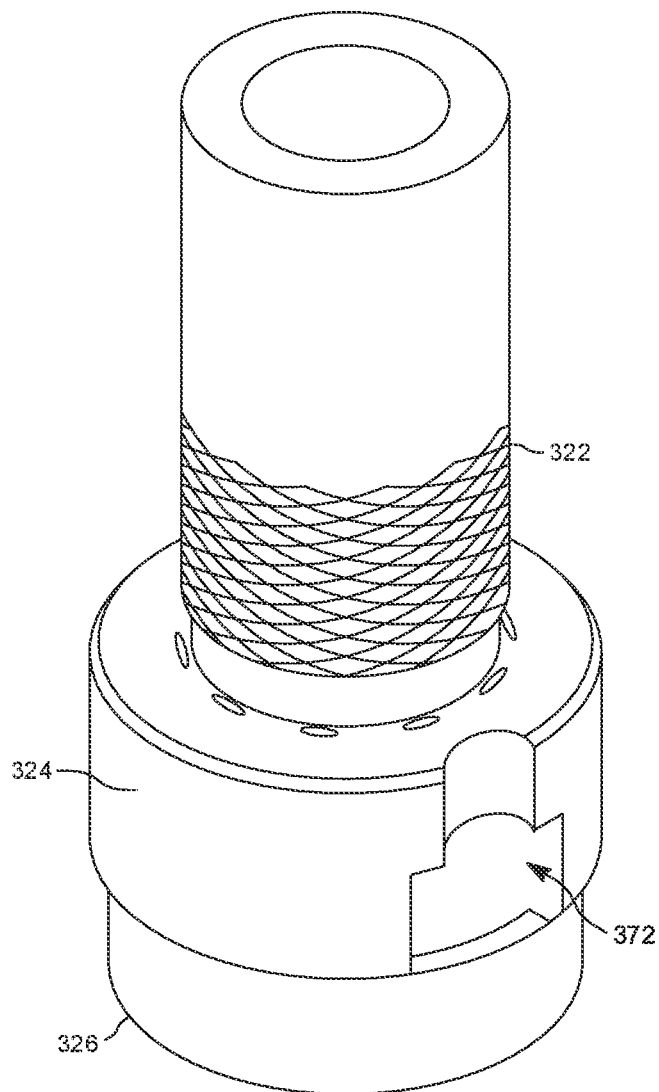
FIGS. 65-67 illustrate multiple views of an example a pin hinge shaft bottom according to an embodiment of the present technology.
Figure 67:
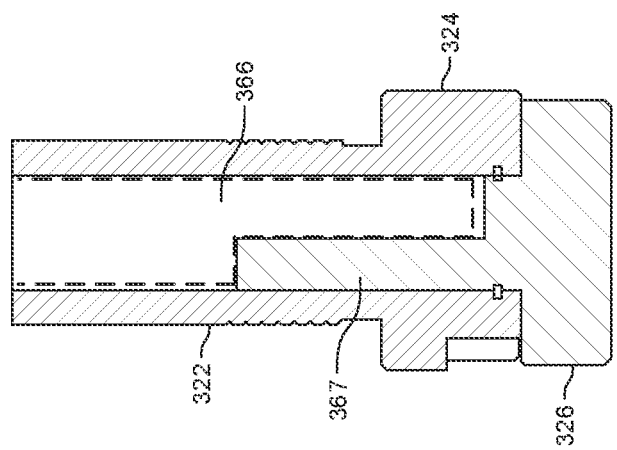
Figure 66:
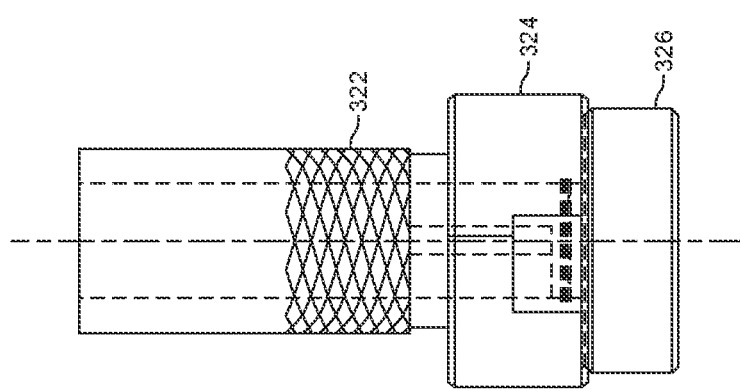

FIGS. 65-67 illustrate multiple views of the pin hinge shaft bottom 324 attached to the adjustable knob 326 and shaft 322, which is configured for insertion into chamber housing 334.

Thus, as explained herein, the disclosed technology provides a way to control movement of a device, such as a door. Advantageously, it can protect devices from other devices slamming into them and thus help prevent damage to devices, harm to people near the devices, and/or loud noises created by devices contacting each other.

It is to be understood that the disclosed technology is not limited in its application to the details of construction and the arrangement of the components set forth in the description or illustrated in the drawings. The technology is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

While various spatial and directional terms, such as top, bottom, lower, mid, lateral, horizontal, vertical, front and the like may be used to describe embodiments, it is understood that such terms are merely used with respect to the orientations shown in the drawings. The orientations may be inverted, rotated, or otherwise changed, such that an upper portion is a lower portion, and vice versa, horizontal becomes vertical, and the like.

Variations and modifications of the foregoing are within the scope of the present technology. It is understood that the technology disclosed and defined herein extends to all alternative combinations of two or more of the individual features mentioned or evident from the text and/or drawings. All of these different combinations constitute various alternative aspects of the present technology.

The invention claimed is:

1. A device for controlling the motion of an object, comprising:
   a body that includes a chamber filled at least in part with a shear thickening fluid,
   a piston that is positioned in the body and that is connected to a cap, the piston configured to exert pressure against the shear thickening fluid in response to a force applied to the cap by the object, wherein the piston includes a plunger that is connected to a piston head,
   a shim, wherein both the shim and the piston head include one or more slots, and
   a rod connected to the piston, the rod configured to adjust an amount of pressure exerted against the shear thickening fluid and wherein the rod includes a first portion and a second portion that can slide with respect to each other, and the second portion includes a lip portion that is received in a hole in the shim, wherein the lip portion receives a plug that is connected to the plunger.

2. The device of claim 1, further including a bushing to guide the cap and plunger into the chamber in response to the force applied to the cap.

3. The device of claim 2, further including a spring that is configured to provide mechanical resistance between the cap and the bushing in response to the force applied to the cap.

4. The device of claim 1, wherein the shear thickening fluid comprises a plurality of nanoparticles.

5. The device of claim 4, wherein the plurality of nanoparticles comprises one or more of an oxide, calcium carbonate, synthetically occurring minerals, naturally occurring minerals, polymers, $SiO_2$, polystyrene, polymethylmethacrylate, or a mixture thereof.

6. The device of claim 1, wherein the shear thickening fluid comprises a polymeric material.

7. The device of claim 6, wherein the shear thickening fluid comprises one or more of ethylene glycol, polyethylene glycol, ethanol, silicon oils, phenyltrimethicone, or a mixture thereof.

8. The device of claim 1, wherein the one or more slots of the shim have a shape and size approximately equal to the one or more slots of the of the piston head.

9. The device of claim 1, wherein the shim is configured to rotate with respect to the piston head thereby adjusting the amount of resistance experienced by the piston.

10. The device of claim 9, wherein rotation of the shim to a first position substantially aligns the one or more slots of the shim with the one or more slots of the of the piston head, and rotation of the rebound shim to a second position substantially misaligns the one or more slots of the shim with the one or more slots of the of the piston head.

11. The device of claim 10, wherein the rod includes a first portion and a second portion that can slide with respect to each other, and the second portion is connected to the shim and when the rod is rotated, the shim is rotated with respect to the piston head.

12. The device of claim 11, further including a knob that is located opposite the cap and that is connected to the first portion of the rod, wherein the knob can be rotated to rotate the rod.

13. The device of claim 12, wherein the rod includes a generally D-shaped lip and the slot shim includes a generally D-shaped hole that receives the lip of the rod.

14. The device of claim 13, wherein the piston includes a plug that is received in the lip of the rod.

15. The device of claim 3, wherein the spring is located in a first portion of the chamber that is fluidly isolated from a second portion of the chamber in which the shear thickening fluid is located.

16. The device of claim 1, wherein the lip portion is rotatable with respect to the plug and the plunger.

17. The device of claim 16, wherein the piston head includes a counterbore with a protrusion, and the lip portion extends into the counterbore and the protrusion limits the rotational movement of the second portion.

18. The device of claim 1, wherein the second portion slides along the first portion and toward the first portion when force is applied to the cap.

19. The device of claim 12, wherein rotation of the knob causes the first portion of the rod to rotate and engage the second portion of the rod and cause the second portion of the rod to rotate, which causes the shim to rotate.

20. The device of claim 1, wherein the shear thickening fluid is configured to have a decreasing viscosity in response to a first range of shear rates and an increasing viscosity in response to a second range of shear rates, wherein the second range of shear rates is greater than the first range of shear rates.

21. The device of claim 20, wherein when the piston exerts pressure against the shear thickening fluid, the motion of the object transitions from a first velocity to a second velocity when the shear thickening fluid correspondingly responds to transitioning from the first range of shear rates to the second range of shear rates, wherein the second velocity is less than the first velocity.

* * * * *